(12) United States Patent
Stewart

(10) Patent No.: US 7,081,219 B2
(45) Date of Patent: *Jul. 25, 2006

(54) METHOD AND MACHINE FOR MANUFACTURING MOLDED STRUCTURES USING ZONED PRESSURE MOLDING

(76) Inventor: David H. Stewart, 1260 Shotwell Dr., Houston, TX (US) 77020

( * ) Notice: Subject to any disclaimer, the term of this patent is extended or adjusted under 35 U.S.C. 154(b) by 302 days.

This patent is subject to a terminal disclaimer.

(21) Appl. No.: 10/388,411

(22) Filed: Mar. 17, 2003

(65) Prior Publication Data

US 2003/0227107 A1  Dec. 11, 2003

Related U.S. Application Data

(63) Continuation of application No. 09/936,874, filed as application No. PCT/US00/06932 on Mar. 17, 2000, now Pat. No. 6,558,590.

(60) Provisional application No. 60/124,978, filed on Mar. 18, 1999.

(51) Int. Cl.
  *B29C 43/10*  (2006.01)
  *B29C 43/58*  (2006.01)
  *B29C 70/48*  (2006.01)

(52) U.S. Cl. ............... 264/40.5; 264/134; 264/136; 264/137; 264/257; 264/313; 425/112; 425/149; 425/163; 425/415; 425/419

(58) Field of Classification Search ............... 264/40.1, 264/40.5, 134, 136, 137, 236, 257, 313, 334; 425/112, 149, 163, 415, 419
See application file for complete search history.

(56) References Cited

U.S. PATENT DOCUMENTS

| | | |
|---|---|---|
| 4,307,050 A | 12/1981 | Greten |
| 4,438,062 A | 3/1984 | Griffith et al. |
| 4,458,189 A | 7/1984 | Dollerschell |
| 4,753,713 A | 6/1988 | Gunderson |
| 4,855,095 A | 8/1989 | Sato |
| 4,923,383 A | 5/1990 | Kurumaji et al. |
| 5,040,962 A | 8/1991 | Waszeciak |
| 5,045,251 A | 9/1991 | Johnson |
| 5,204,042 A | 4/1993 | James et al. |
| 5,207,957 A | 5/1993 | Heath et al. |
| 5,217,654 A | 6/1993 | Buckley |
| 5,217,656 A | 6/1993 | Buckley et al. |

(Continued)

OTHER PUBLICATIONS

Young, W-B, et al., "Study on Compression Transfer Molding," *J. Composite Materials*, vol. 29, No. 16 (1995).

*Primary Examiner*—Angela Ortiz
(74) *Attorney, Agent, or Firm*—Finnegan, Henderson, Farabow, Garrett & Dunner, LLP

(57) ABSTRACT

A method for manufacturing a molded structure in a press that includes a first mold and a second mold is provided. The second mold has a plurality of pressure actuators, with each pressure actuator capable of independent operation. The method includes the steps of positioning a preform having a thickness in the first mold, placing a quantity of resin adjacent the preform so as to create a resin reservoir, and then selectively actuating one or more of the pressure actuators apply pressure to the resin reservoir to force at least a portion of the resin reservoir to infuse through the thickness of the preform. The method may also include curing the resin-infused preform, and then removing the cured resin-infused preform from the first mold.

21 Claims, 13 Drawing Sheets

U.S. PATENT DOCUMENTS

| | | |
|---|---|---|
| 5,464,337 A | 11/1995 | Bernardon |
| 5,518,385 A | 5/1996 | Graff |
| 5,588,392 A | 12/1996 | Bailey |
| 5,601,852 A | 2/1997 | Seemann |
| 5,658,520 A | 8/1997 | Hards |
| 5,672,227 A | 9/1997 | Chiu |
| 5,737,188 A | 4/1998 | Flierl et al. |
| 5,770,129 A | 6/1998 | Monti |
| 6,080,343 A | 6/2000 | Kaufman et al. |
| 6,136,236 A | 10/2000 | Boccard et al. |
| 6,168,408 B1 | 1/2001 | Boime et al. |

METHOD AND MACHINE FOR MANUFACTURING MOLDED STRUCTURES USING ZONED PRESSURE MOLDING

This application is a continuation-in-part of U.S. patent application Ser. No. 09/936,874, filed Dec. 28, 2001 now U.S. Pat. No. 6,558,590, entitled "Method And Machine For Manufacturing Molded Structures Using Zone Pressure Molding," which is the national stage filing of PCT/US00/06932, filed on Mar. 17, 2000, which claims priority under 35 U.S.C. §119(e) to U.S. provisional application No. 60/124,978, filed Mar. 18, 1999, incorporated herein by reference.

BACKGROUND OF THE INVENTION

1. Field of the Invention

The present invention relates to liquid molding. Specifically, the present invention relates to active control of the liquid molding process and press during mold filling and curing.

2. Description of the Related Art

A brief overview of the techniques that currently dominate the production of liquid molded composites will be useful in demonstrating the benefits of the process of the present invention. Conventional processes that are most similar in capabilities to the present invention are: compression molding of Sheet Molding Compound ("SMC"), Resin Transfer Molding ("RTM"), and Structural Reaction Injection Molding ("SRIM").

The SMC process typically starts with a sheet of unsaturated polyester resin filled with various thickeners and reinforced with chopped glass. The sheets are cut and placed in a heated tool and compressed at temperatures ranging from 140–200° C. (280–390° F.) and pressures ranging from 7–14 MPa (1000–2000 psi) down to as little as 1.4 MPa (200 psi) for new low pressure formulations. As the sheets are heated and compressed, the viscosity drops and the material flows along the contours of the mold, typically curing in about 2 minutes. The SMC process differs from liquid molding techniques in that the resin and fibers are premixed in a separate operation. The primary advantage of the SMC process is that a preform does not have to be constructed. The primary disadvantages of the SMC process are its relatively long cycle times and low strength to weight ratios of the resulting parts.

In a typical RTM process, a fiber preform is placed in matched tooling, compressed, and low viscosity statically mixed reactants are injected into the cavity through single or multiple ports at pressures ranging from vacuum driven to 1.4 MPa (200 psi). As the resin front progresses, it forces out any entrapped air through one or more vents placed in the matched tooling. After the resin begins to flow out of the vents, the vents are closed and the part is allowed to cure, typically from 4 to 30 minutes, depending on the part size, part geometry, the number and placement of ports, and the specific resin system. A diagram of the RTM process appears in FIG. 1 below. In general, tooling and energy costs are low for the RTM process, but its high cycle times reduce manufacturing volumes. The main drawback of the RTM process, as a mass production technique, is its fill time.

FIG. 2 shows that the SRIM process is similar to the RTM process, with the primary exceptions being that the resin is impingement mixed at very high pressures 100 MPa (1000 bar) and then injected into a heated tool at pressures ranging from 0.5–1.7 MPa (70–200 psi). The resin systems used in the SRIM process react very quickly and can cure in as little as 45 seconds. To allow mold filling before the resin gels, the preforms usually do not exceed a 30% volume fraction. The SRIM process has generally been employed with better quality molds, injection equipment, and process control than available for the RTM process. These factors have led to a distinction between the two processes; the RTM process as a slow, inexpensive technique producing very strong parts vs. the SRIM process as a more sophisticated and expensive method for the very rapid production of non-structural components. In reality, the differences between the processes are slight. The SRIM process is simply the RTM process using reaction injection molding, typically in a higher quality, heated mold.

FIG. 3 schematically shows the progression that the resin front takes as it infuses a part in the RTM and SRIM processes. Typical times for injection, for example, into a preform with a 40% fiber volume fraction, are noted. If the resin is forced too quickly through the part, air bubbles may be trapped or the fibers of the preform may be displaced, degrading the properties of the part. Alternatively, changing the flow path, for instance, by infusing the resin from the center of the part out to the edges, is difficult and may result in nonuniform properties. In general, the resin flow path is the limiting factor in reducing the cycle time of these techniques.

In "Study on Compression Transfer Molding (CTM)" published in the *Journal of Composite Materials*, Vol. 25, No. 16,1995, Young and Chiu describe the CTM goal to be "impregnation through the thickness direction." In their test apparatus they left the mold halves slightly open and injected resin into the cavity at various pressures and recorded filling time. If the mold was not opened enough, the fiber preform merely decompressed somewhat, still impeding the flow of the resin. Once the proper opening distance was determined, mold fill times dropped by 37–46% over RTM at the same injection pressure. The proposed mechanism for this was a channel flow between the preform and mold. The mold is then closed, completing infusion in the thickness direction very quickly with minimum disturbance of the fibers. The strength and modulus of the completed part was shown to be the same as an RTM part. The limitation of CTM is that the preform is not rigidly held in place during injection and does not create a true open channel for resin to flow through, limiting the maximum rate at which injection can occur. The lowered flow resistance RTM process is still very helpful, especially when infusing very large planar parts like automobile body panels. It should also be noted that if very high fiber volume fractions are sought, the amount of resin injected into the mold is not enough to distribute throughout the mold, and compression times must be lengthened to allow time for some of the resin to flow through the in-plane direction. The Dodge Viper used a version of CTM called Injection Compression System (ICS) for many of its components, but as yearly volumes were low, cycle times could be as long as 15 minutes. Part finish was not perfect, but this may have been a problem with other aspects of the process such as resin system, release agents, etc.

Another innovative process that attempts to infuse primarily through the thickness direction is the patented Seemann Composite Resin Infusion Molding Process ("SCRIMP"). This is a variation on RTM with vacuum assist under a flexible tool, so only one hard mold surface is required. The resin is channeled through a high permeability "distribution medium" placed between the tool surfaces and the preform. A vacuum is pulled on the preform and the resin is introduced into and quickly distributed through the medium. The resin then infuses into the part through the thickness direction, creating a very uniform, high volume fraction part. A porous peel ply is placed between the distribution medium and the preform so that it can be removed and disposed of. The process has proven extremely popular for infusing huge, planar parts like large boat hulls and railway cars. SCRIMP works well, but as a vacuum driven process, it is too slow and also generates too much scrap to be considered for mass production. Seemann has another patent (U.S. Pat. No. 5,601,852) which details a variation of the through thickness approach used in SCRIMP that employs physical channels in a flexible, molded outer tool surface. The tool can, unlike the vacuum bag distribution medium, be quickly cleaned and reused, but will still not generate the cycle times or scrap levels required for mass production.

Another interesting RTM-like system developed by James et al. of the Northrop Corporation is detailed in U.S. Pat. No. 5,204,042. This process attempts to avoid the maximum fiber volume limitation of RTM, quoted as "50–60% by weight" (presumably for glass) by sandwiching an elastomeric pad made of Dow Silastic® E silicon rubber between mold surfaces. The pad expands when heated, compressing the fiber at up to "75–80% by weight." The part is infused under lower compaction and then compresses tremendously when heated for curing. This speeds infusion while providing a very high quality part. Like SCRIMP, only one tooled mold surface is needed, but a very rigid upper mold section is required.

The trend in RTM-like processes is toward through-thickness infusion. CTM, SCRIMP and other variants achieve superior results to traditional liquid molding with their modifications. But each must trade something for its gains. CTM decreases mold filling times, but is still sensitive to the volume fraction of the preforms. SCRIMP works well even with high volume fractions, but is limited in speed by using vacuum pressure to drive infusion. The Northrop process delivers improved mold filling and very high volume fraction, but is still limited by its in-plane infusion path.

An important factor in many modern processing machines is the amount of control that can be exercised over the process. The advent of modern computer technology has allowed the development of remote input/output systems that communicate over one wire and have very sophisticated programming and diagnostic tools. These systems have been finding their way into more and more industrial applications and will someday displace all current PLC based controllers as well as introducing sophisticated computer control where it has never been before. Although there are many different protocols in the market, the industrial control market and the personal computer market have been getting together to create some software and communication standards. Even today there is a vast range of hardware and software solutions from basic on/off control of a motor to running entire plants.

Each of the known processes have limitations that prevent them from being used to produce structures that exploit the full potential of composite material design. The SMC process has a very low cycle time, but it is restricted to relatively low fiber volume fractions with short fiber lengths, reducing the specific strength of the part. The RTM process can operate with higher fiber volume fraction preforms, but the resin typically must flow through the plane of the preform and the higher the fiber volume fraction, the lower the permeability, and the more difficult and time consuming the resin flow step becomes. Variations of the RTM process have attempted to solve the resin flow problem by using multiple, staged injection ports, but process control can be very difficult and each mold must be painstakingly optimized. In the SRIM process the flow rates are even higher to allow the use of faster curing impingement mixed resins, such as polyurethanes. The required faster flow rates limit the maximum fiber volume fraction to a level well below the level for optimizing the properties of the part. These known methods have achieved production-ready cycle times, but the trade-off for this is a low fiber volume fraction, resulting in a part with extra resin that adds unnecessary weight and cost.

The ideal liquid molding process is one which: (1) can easily infuse very high
fiber volume fraction preforms thereby maximizing the physical properties of the resulting part and minimizing the cost of resins; (2) can offer very low cycle times thereby enabling large volume productions as cheaply as possible; (3) can use inexpensive tooling and process equipment; and (4) can quickly, easily, and cost-effectively accommodate small production runs.

SUMMARY OF SOME OF THE ASPECTS OF THE INVENTION

The advantages and purposes of the invention will be set forth in part in the description which follows, and in part will be obvious from the description, or may be learned by practice of the invention.

To attain the advantages and in accordance with the purpose of the invention, as embodied and broadly described herein, the zoned pressure molding press and process, in a first aspect, encompasses a method for manufacturing a molded structure in a press that includes a first mold and a second mold. The second mold has a plurality of pressure actuators, with each pressure actuator capable of independent operation. The method includes the steps of positioning a preform having a thickness in the first mold, placing a selected quantity of resin in the first mold, thereby creating a resin reservoir, and then selectively actuating one or more of the pressure actuators to force at least a portion of the resin reservoir to infuse through the thickness of the preform. The method also includes curing the resin-infused preform, and then removing the cured resin-infused preform from the first mold. After the step of positioning, a top cover may be placed upon the preform. The top cover may be sealed to the first mold with one or more of the pressure actuators. Alternatively, the top cover may be sealed to the first mold by a mechanical clamping device. The resin reservoir may be formed between the top cover and the preform. The step of selectively actuating one or more of the pressure actuators may include a computer for controlling the pressure actuators. Moreover, the computer may control the pressure actuators at least partially in response to a first sensor. The first sensor may be a pressure or temperature sensor.

In a second aspect, the invention encompasses a method for manufacturing a molded structure in a press that includes a first mold and a second mold. The second mold has a plurality of pressure actuators, and each pressure actuator is capable of independent operation. The method includes the steps of placing a selected quantity of a raw material into the first mold, thereby creating a raw material reservoir, and selectively actuating one or more of the pressure actuators to force at least a portion of the raw material reservoir to conform to the first mold. The method also includes curing the raw material, and removing the cured part from the first mold. Before the step of placing, a preform having a thickness may be positioned into the first mold, and the step of selectively actuating thereby forces the raw material to infuse through the thickness of the preform.

In a third aspect, the present invention encompasses a machine for manufacturing a molded part formed from raw material that is molded and cured. The machine includes a first mold and a second mold. The first mold is for holding the raw material while the raw material is molded and cured and for defining a first surface of the molded part. The second mold is for defining a second surface of the molded part. The second mold has a plurality of pressure actuators, each pressure actuator capable of acting substantially independently upon the raw material while the raw material is being molded. Each pressure actuator may be capable of acting substantially independently upon the raw material while the raw material is cured. Additionally, a controller may actively control the plurality of pressure actuators. Moreover, one or more first mold sensors may be incorporated into the first mold, whereby the controller receives feedback from one or more of these first mold sensors. Further, one or more pressure actuator sensors may be incorporated into one or more of the plurality of pressure actuators, whereby the controller receives feedback from one or more of these pressure actuator sensors. The controller may include a computer.

In a fourth aspect, the present invention may encompass a method for molding a top cover from raw material, the top cover for use in a machine for molding a part. The machine has an upper and lower mold, the upper mold having a plurality of pressure actuators, and each pressure actuator capable of independent operation. The method includes the steps of positioning a prototype part having a top surface in the lower mold, placing the raw material onto the top surface of the prototype part, actuating at least one of the plurality of pressure actuators to contact the raw material, and curing the raw material. Additionally, the step of actuating may include the at least one pressure actuator applying a given pressure to the raw material. Alternatively, the step of actuating may include the at least one pressure actuator being displaced a prescribed distance. Moreover, prior to the step of placing, each of the plurality of pressure actuators may be lowered into contact with the top surface of the prototype part and the plurality of pressure actuators may be raised such that each pressure actuator maintains a constant position relative to the other pressure actuators. Even further, the step of actuating may include lowering the plurality of pressure actuators such that each pressure actuator maintains a constant position relative to the other pressure actuators.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 16 is an example of a tool design incorporating nested zones with sliding seals.

FIG. 17 is an example of a detail of a seal design.

DETAILED DESCRIPTION OF THE PREFERRED EMBODIMENTS

Figure 1:
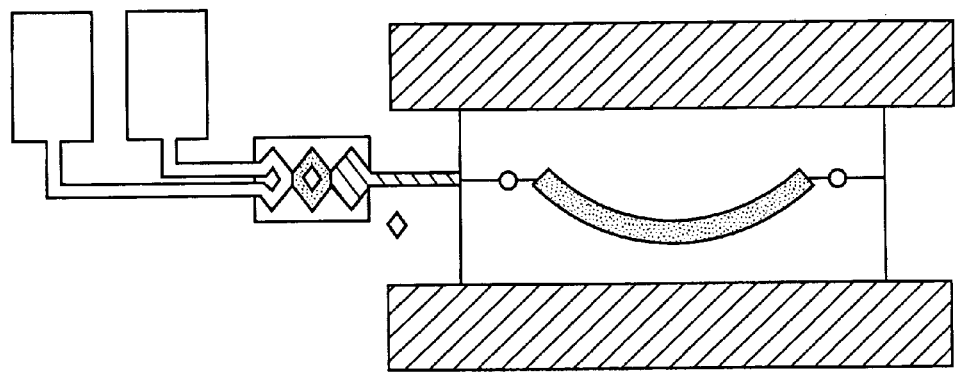
FIG. 1 is a schematic illustration of the RTM process.
Figure 2:
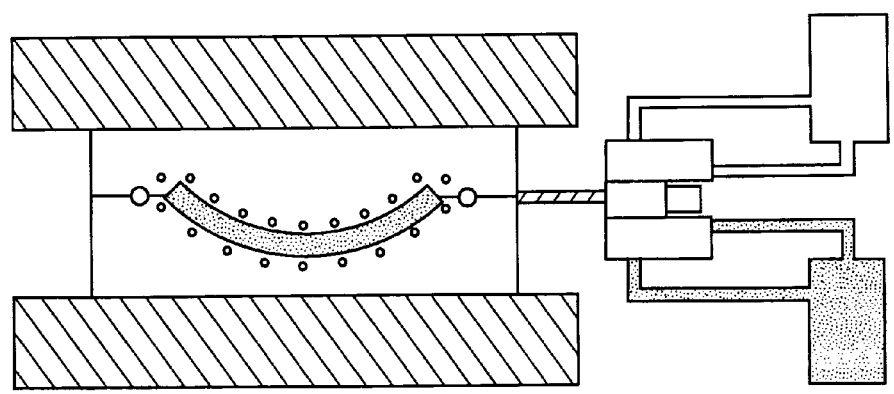
FIG. 2 is a schematic illustration of the SRIM process.
Figure 3:
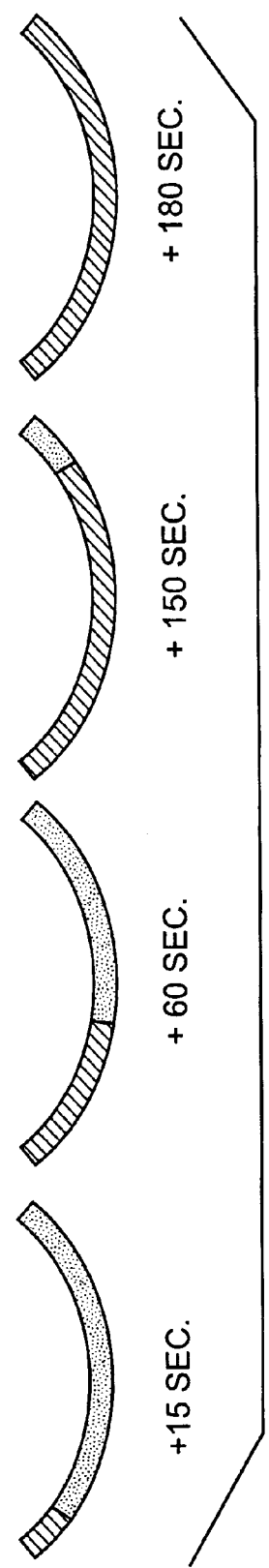
FIG. 3 is a schematic illustration showing the progression that a resin front takes as it infuses a part in the RTM and SRIM processes.
Figure 4A:
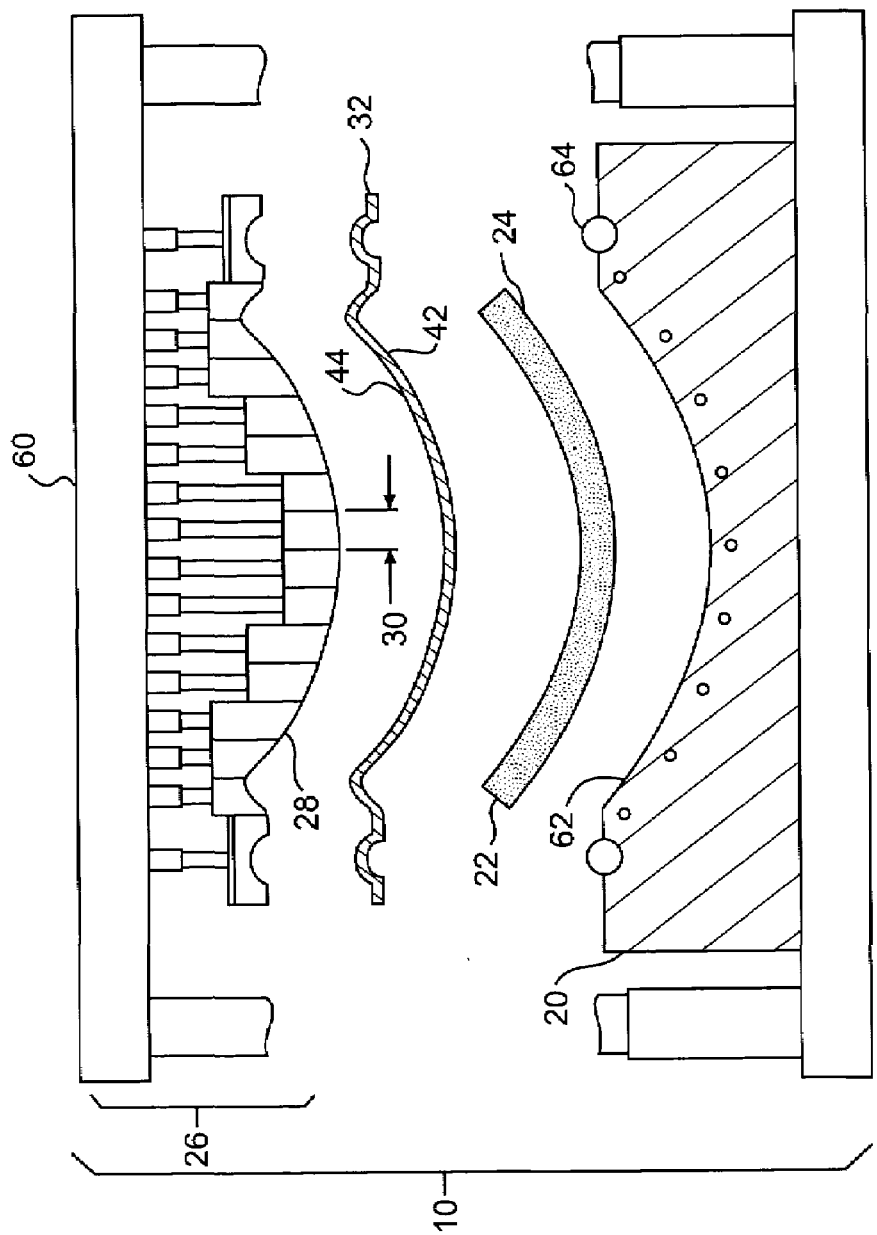
FIG. 4a shows an exploded view of an embodiment of the present invention.
Figure 4B:
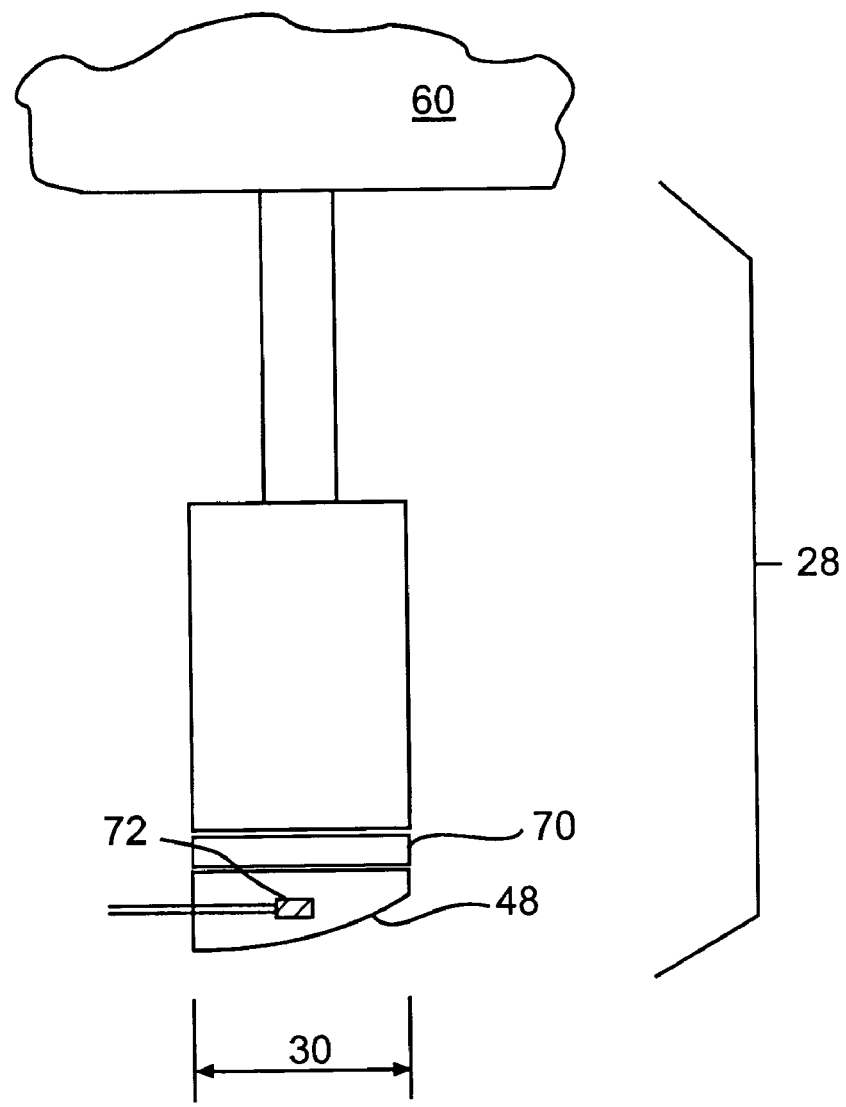
FIG. 4b shows an example of a pressure actuator.

Reference will now be made in detail to the present preferred exemplary embodiments of the invention, which are illustrated in the accompanying drawings. Wherever possible, the same reference numbers will be used throughout the drawings to refer to the same or like parts.

The current invention improves on the state of the liquid molding art by, among other things, providing an order of magnitude reduction in mold filling times, and providing for much greater levels of process control.

Process Overview

The present invention avoids the shortcomings of other liquid molding processes and presses by taking a different approach to the infusion of a fiber preform. Rather than injecting resin through the in-plane direction, as in the RTM and SRIM processes, the process and press 10 of the present invention distribute the resin over the surface of the part under active control, then force it through the thickness direction. This drastically reduces fill times without disturbing fiber orientation, allowing the use of both high volume fraction preforms (60%+) and rapidly curing resin systems, such as thermosets, in the same process. The zoned pressure molding technique of the present invention provides full control over the flow of the resin.

As depicted in FIGS. 5a–9, the zoned pressure molding process of the present invention utilizes a lower mold 20 into which raw material 22 for molding is placed. Typically, the raw material 22 includes a fiber preform 24 and resin 34, although the raw material 22 may include just the resin 34. Moreover, the resin 34 need not be a single component, but may include fillers and/or binders of any of a variety of materials. An upper mold assembly 26 is provided for applying pressure on the surface of the raw material 22. The upper mold assembly 26 includes an array of pressure actuators 28. Each of these pressure actuators 28 may apply pressure to a specific portion or zone 30 of the raw material 22 in the lower mold 20. A top cover 32 may be placed over the raw material 22. By controlling the pressure applied by the individual pressure actuators 28 on each of the zones 30, complete control of the pressure distribution on the raw material 22 may be achieved both during the mold filling process and during cure.

FIGS. 5a–9 show a typical progression of the zoned pressure molding process of the present invention. In FIG.

Figure 5A:
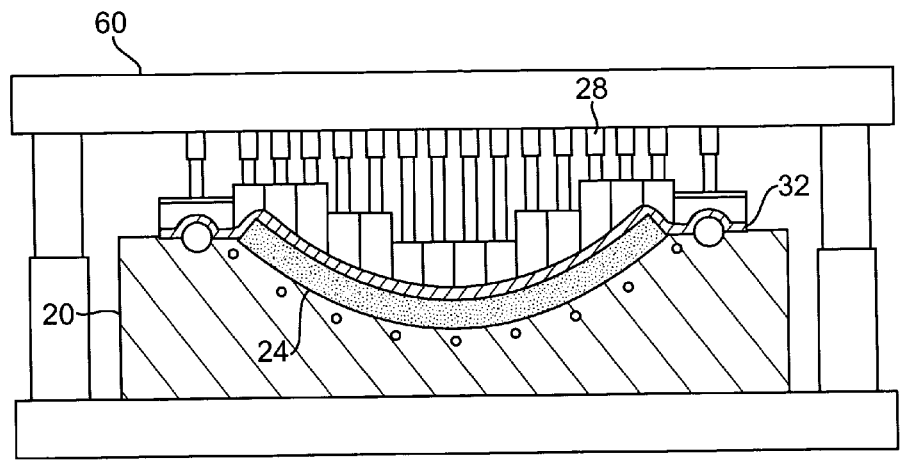
FIGS. 5a–9 show a typical progression of the process of the present invention.
Figure 5B:
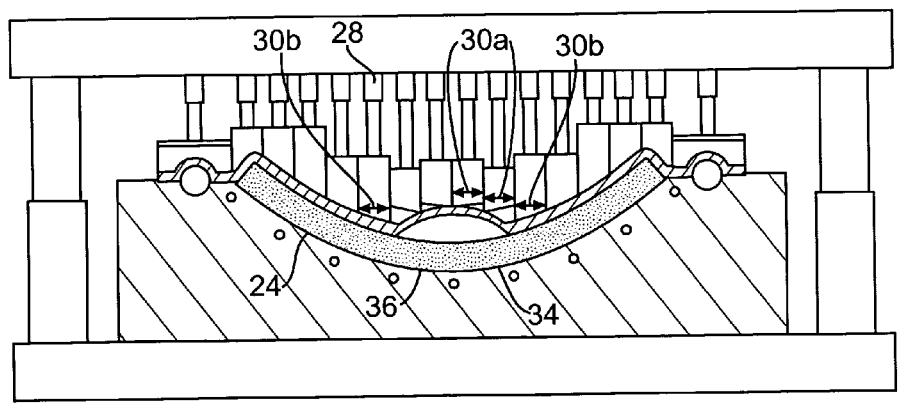
Figure 6:
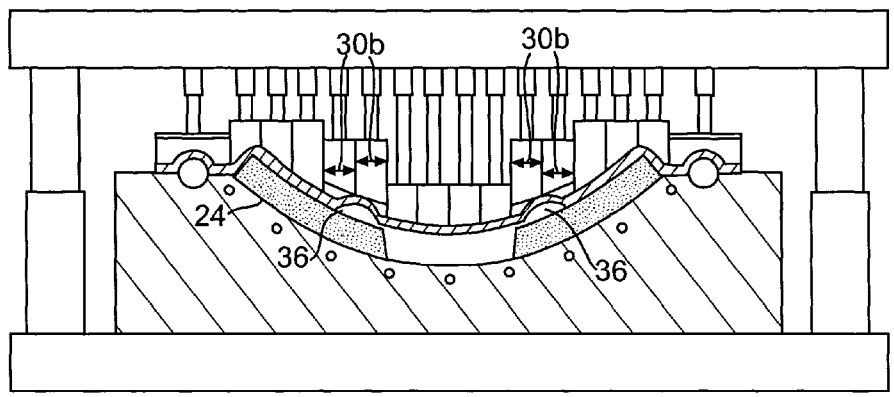
Figure 7:
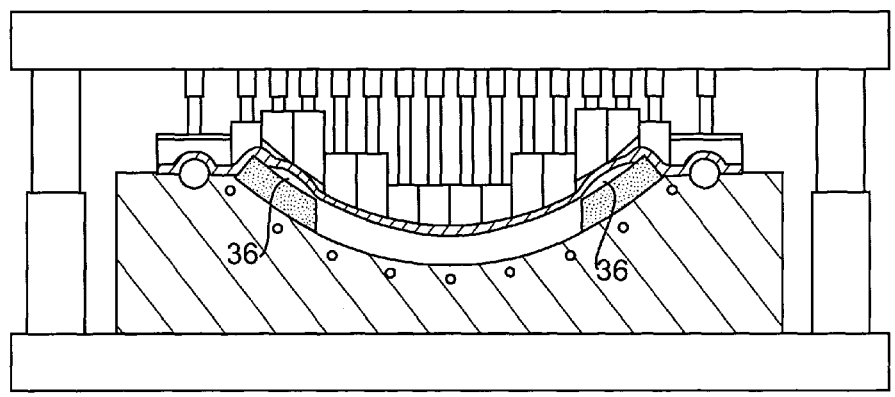
Figure 8:
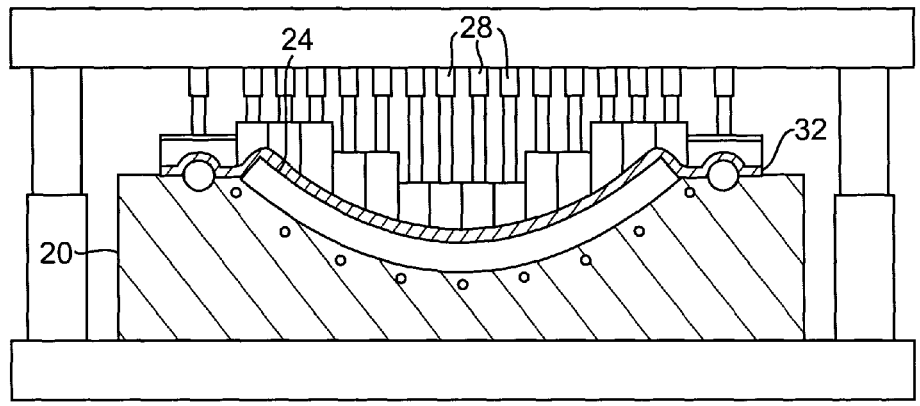
Figure 9:
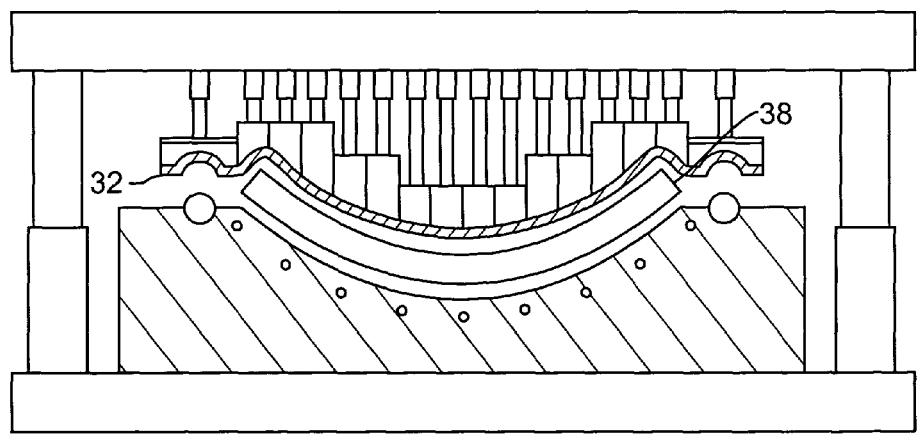

5a, the preform 24 is loaded into the mold 20, the top cover 32 is sealed, and a vacuum is drawn on the part. The pressure actuators 28 are then actuated to create additional pressure on the preform 24. In FIG. 5b, one or more central zones 30a are left uncompressed by the pressure actuators 28 and a quantity of resin 34, preferably a carefully metered quantity of resin, is injected through the top cover 32 into these uncompressed zones. The bubble of resin 34 that forms between the preform 24 and the top cover 32 is then used as a reservoir 36 for infusing the preform 24. The pressure on the central zones 30a is progressively raised, forcing resin 34 through the thickness of the preform 24 in this area. Typically, the pressure on the central zones 30a is raised while the pressure on the adjacent zones 30b is maintained at a relatively high level. This forces the resin 34 to travel through the thickness of the preform 24 in the central zones 30a, and inhibits the travel of the resin 34 into the adjacent zones 30b. When the central zone 30a has been infused through the thickness, the pressures on the adjacent zones 30b are reduced and the pressures on the central zones 30a are raised to full, forcing the reservoir 36 to flow into the adjacent zones 30b as shown in FIG. 6. The result is a relatively, very rapid flow of resin 34 from one zone to another. Also, as compared to prior known liquid molding processes, as the resin 34 flows into the preform 24, it does so over a much larger area primarily through the thickness direction. The cycle is repeated until the resin 34 has reached the perimeter of the top cover 32 (FIG. 7). Once the preform 24 is completely infused (FIG. 8), the part 38 is allowed to cure and the finished part 38 is removed from the mold 20 (FIG. 9). In this manner, the process of the present invention could allow a theoretical reduction in mold filling time of at least an order of magnitude.

The zoned pressure molding process and press 10 of the present invention also provide some additional features that are useful in controlling part quality. During infusion, converging resin 34 flow fronts can cause weld lines or create voids in a part. The process of the present invention can eliminate or reduce these weld lines and voids by cycling the pressure actuators 28, i.e., controlling individual pressure actuators or groups of pressure actuators so as to vary the pressure applied to specific zones 30. By cycling the pressure actuators 28, the resin 34 in these zones can be thoroughly mixed. Thus, after the initial infusion of resin 34, the pressure actuators 28 could set up a kneading cycle that creates micro flows in the resin 34 throughout the preform 24, insuring complete fiber wet-out. Also, for instance, preforms with widely varying thicknesses and/or porosities could be infused without concern for the irregular shape of the resin front. A pressure actuator control algorithm for any specific given part could be developed to accommodate any necessary or preferred flow regime.

Top Cover

The top cover 32, which may provide the upper mold surface 40, transmits the forces applied by the pressure actuators 28 to the preform 24 set into the lower mold 20. The top cover 32 typically needs sufficient flexibility to accommodate the zoned action of the pressure actuators 28, and yet sufficient stiffness to accommodate the transition areas between zones 30. The lower surface 42 of the top cover 32 is preferably molded to the shape of the preform 24. In operation, the top cover 32 is placed over the preform 24, and preferably sealed, onto the lower mold 20. Because the top cover 32 is flexible, it can deform to accommodate flow of resin 34 over, instead of through, the preform 24 when the pressure actuators 28 are released or partially released.

Figure 10:
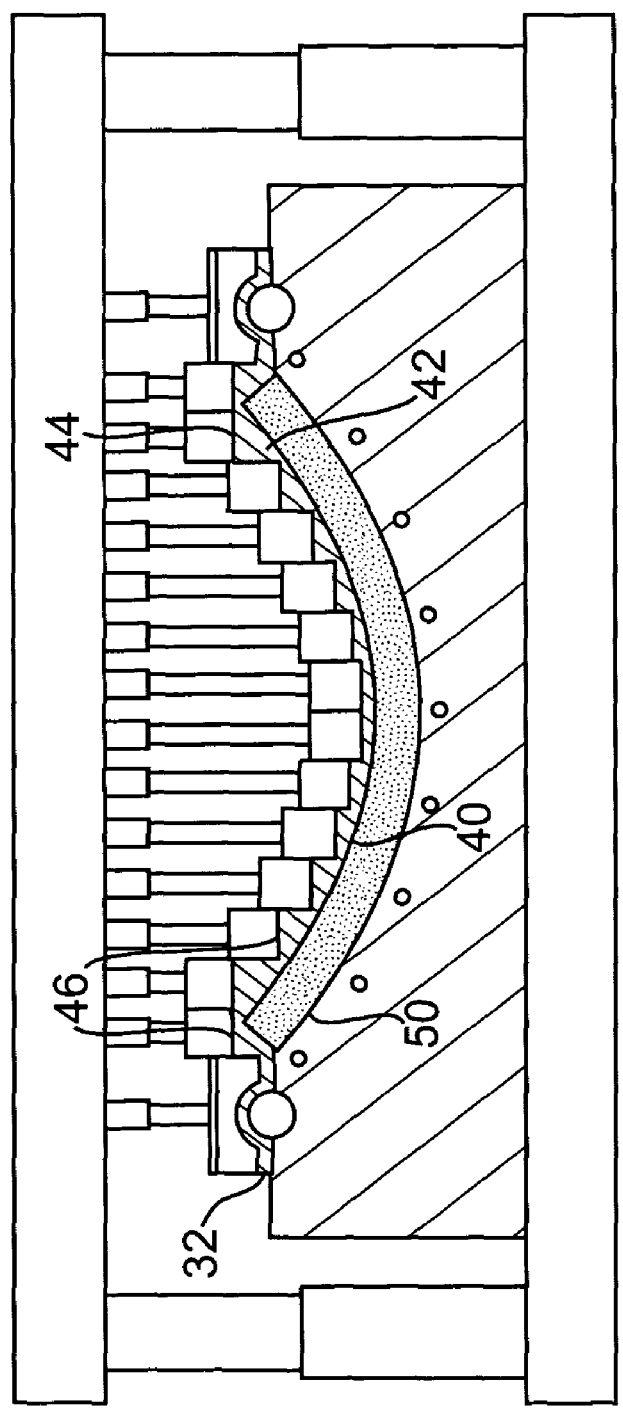
FIG. 10 shows a stepped top cover in situ.
Figure 11:
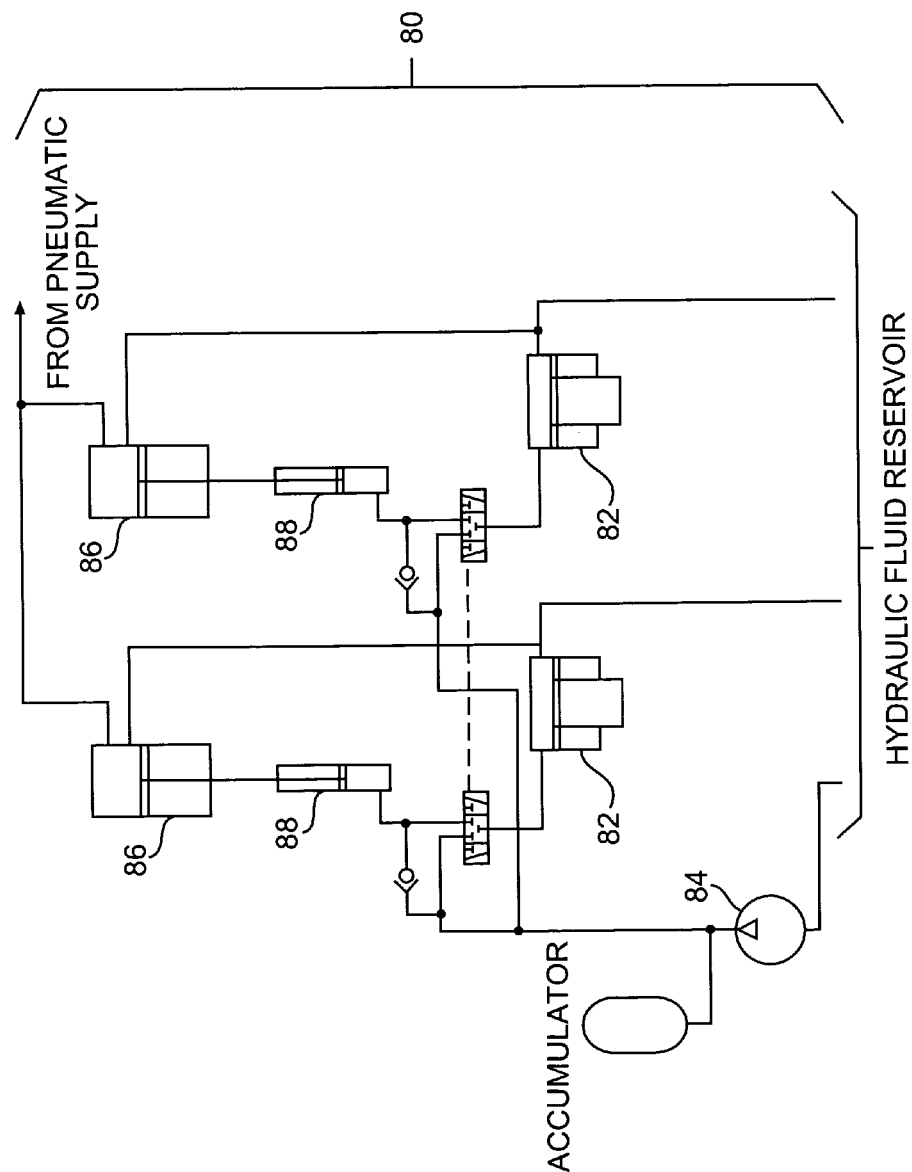
FIG. 11 is a schematic of a hybrid pneumatic/hydraulic actuator system.

The top cover 32 could be made such that the upper surface 44 of the top cover 32 is stepped, i.e., the upper surface 44 could be provided with multiple pressure actuator contact zones or steps 46, each step being perpendicular to the axis of actuation of the pressure actuators 28 (see FIG. 10). The lower surface 42 of the top cover 32 forms the upper mold surface 40, and thus, the lower surface of the top cover 32 would typically be contoured to the shape of the desired finished part 38. Each pressure actuator 28 could be provided with a substantially flat-bottomed pad 48 for applying force to one of the steps 46 on the upper surface 44 of the top cover 32, regardless of the shape of the lower surface 42. This approach to the construction of the top cover 32, i.e., providing a quasi-generic stepped upper surface 44 to the top cover 32, would allow the design or setup of the press 10 to be essentially independent of the shape of the parts to be molded, thereby providing the flexibility to sequentially run different molds through the same press.

One possible scenario for actual manufacture of such a top cover 32 would start with insertion of a prototype part 50 into the lower mold 20, to enable the lower surface 42 of the top cover 32 to be defined. The pressure actuators 28 could then be lowered to the prototype's upper surface, locked in place, and the upper platen 60, with the locked pressure actuators 28, could be raised to create a gap between the prototype part 50 and the pressure actuators 28. The selected top cover material would then be poured, injected, laid, or otherwise placed either directly or indirectly onto the prototype part 50 in the lower mold 20. The upper platen 60, with the pressure actuators 28 still locked in place, could then be lowered to a position equal to its original position minus the desired top cover thickness, and the top cover material would be allowed to cure.

Another possibility for manufacturing a stepped top cover 32 would start at the mold design level. For instance, software, such as CAD/CAM software, which might be used to design the mold itself could have a feature, selected when the mold is ready to be machined or setup, that would automatically design a separate block with the proper pressure actuator step profile for the upper surface 44 of the top cover 32. This profile could then be machined from an inexpensive tooling material, and used as a mold for the upper surface 44 of the top cover 32.

Alternatively, for a variety of reasons, it may be preferred to use a top cover 32 that does not have a stepped upper surface. For instance, variations in the thickness of the steps 46 could cause the local stiffness of the top cover 32 to vary by an unacceptably large amount. Such stiffness variations might prevent the uniform deflection of the top cover 32 that would normally allow the resin reservoir 36 to be moved from zone to zone. In this case, the pads 48 of the pressure actuators 28 could be designed to more nearly conform to the desired shape of the finished part 38. Manufacturing or forming the top cover 32 could be similar to that described above, but neither the pressure actuators 28 need be locked in place nor a pressure actuator step profile block need be used to mold the upper surface 44 of the top cover 32. Instead, since the pads 48 of the pressure actuators 28 would nearly conform to the top surface of the part 38, the top cover 32 would have a substantially constant thickness, and the top cover material need only be laid onto the prototype part to a desired thickness. Indeed, in some applications, the top cover 32 would only need to be a thin flat sheet to aid in sealing the mold, and in such instances, a material such as thin, flat, elastomeric sheets could be used to form the top cover 32. Even further, such an elastomeric material be could supplied in a partially cured state, which would then conform to the preform 24 for the final cure. Conversely, if a mold, as described above, is desired to aid in forming the upper surface of the top cover 32, it could be designed/machined directly from the CAD/CAM software.

Also as described above, the pads 48 of the pressure actuators 28 could be manufactured to conform or nearly conform to the top surface of the finished part 38.

This could be accomplished by casting and curing the pad material onto a prototype part in the mold, and then cutting the pad material into the proper number of pieces.

In even another possible construction, the pads 48 of the pressure actuators 28 and the top cover 32 could be formed as an integral unit. This configuration might be especially applicable if there are no abrupt changes in the curvature of the finished part 38, the range of motions of the pressure actuators 28 during the resin infusion steps are small, and the attachment of the pads 48 to the pressure actuators 28 allows a certain degree of tilt or play. As with the manufacture of the conforming pads described above, the integral pads 48/top cover 32 could be cast onto a prototype part in the mold and cured in situ. With the integral pads 48/top cover 32 attached to the pressure actuators 28, the pressure actuators 28 would be limited to very small relative motions.

The main focus of top cover material selection is ensuring enough flexibility to provide for a sufficient resin reservoir 36, while having enough stiffness to allow for a continuous pressure profile between adjacent zones 30. The stiffness must also be high enough to prevent undesirable deforming or smearing of the top cover 32 when curvature of the molded part is high. Furthermore, the large number of cycles required for production requires a top cover material that is fatigue and wear resistant. Additionally, the nature of the liquid molding process requires a high maximum temperature and the capability to handle repeated thermal cycling. Compatibility with the many different resin systems used in the liquid molding process must also be considered when selecting a top cover material. Finally, candidate materials that are only available in sheet form must be flexible enough to conform to areas of high curvature, as well as to deform properly around any inserts, as discussed below. The flexible top cover 32, which forms the upper mold surface 40, could be constructed with a fiber reinforced elastomer or rubber modified vinylester.

In most situations, it may be desirable to seal the top cover 32 to the lower mold surface 62. Two alternative methods for providing such a seal are presented. A first option could be to have a mechanism press the top cover 32 to the lower mold 20 around the edges of the mold. Such a mechanism, for instance, could be actuated by pneumatics, similar to the pressure actuators. Another option could be a simple mechanical clamp. In one aspect, the top cover 32 could be rigidly connected to the upper platen 60, sealing the upper mold assembly 26 to the lower mold 20 as the platen 60 is lowered into position. The actual sealing element 64 could be formed from the top cover material itself or from separate plates, gaskets, o-rings, nubbins, etc. Furthermore, the method used to seal the top cover 32 to the lower mold 20 could also allow for net-shape part molding, i.e., the molding of finished parts 38 that do not require trimming.

In most instances, the top cover 32 will also be required to include or interface with a variety of fixtures 66 (see FIG. 13), including (but not limited to) injection nozzles, vacuum and other inserts, sensors, part release inserts, and caul plates.

Finally, it may be desirable to include temperature control into the top cover 32. Temperature control may be accomplished, among other ways, through choice of material. For instance, the top cover material may include additives such as chopped fibers. Alternatively, the top cover 32 may be composed of multiple layers of one or more materials, including, for instance, a possible metallic layer. Temperature control may also be accomplished by having a top cover 32 that is substantially thermally transparent (i.e. thin). Furthermore, active temperature control may be incorporated into the top cover 32. In some instances, electrical heating of the top cover 32 may be the best option.

Sliding Zone Seals

Alternatively, instead of using top cover 32 to contain the resin and seal against vacuum, another option is to use seals 52 located between the sliding portions 54 of actuators 28. Sliding portions 54 of actuators 28 could include, for instance, transfer plates 70 or pads 48. Sliding portions 54 of actuators 28 may be machined and positioned with a controlled gap between adjacent sliding portions. Channels 56 for seals 52 may be machined into the sides of sliding portions 54 such that the seals are captive during all relative motions of the sliding portions 54. At the outer boundaries of the array of actuators 28 or sliding portions 54, a captive or stationary portion 58 may be provided as a surface for the outermost sliding portions 54 to seal against. FIG. 16 shows an embodiment wherein a series of nested sliding portions 54 are provided with seals 52. Part A is the cavity of the tool, upon which part B contacts with an unmoving face seal. The inside surface of part B provides a sealing surface for part C, within which parts D and E nest. Seal channels 56 are machined into the outside face of parts C–E. After assembly, parts B–E remain together, moving relative to each other by only a small amount during actuation, so that the alignment of seals 52 is not disturbed. The individual sliding portions 54 may be actuated by hydraulic or other means and may also be stabilized by external or internal bearings or bushings.

The tighter tolerances that may be required to provide a consistent gap between the sealing surfaces increase the price of the tool, but sliding seals 52 may offer several advantages at higher production volumes. Wear on top cover 32, due to chemical, thermal, and physical stresses, may be eliminated. Further, top covers made from silicon-based materials should not be exposed to epoxy resins for lengthy periods of time since the amine curing agents tend to embrittle the silicon. Additionally, top covers 32 may have relatively large coefficients of thermal expansion (CTE). Any mismatch of the CTE of top cover 32 to the rest of the tool may either impart undesirable physical stresses when installed at room temperature or risks the possibility of wrinkles inside the tool at elevated temperatures. While these issues may not be a problem at low production volumes, the reduced maintenance associated with the use of a sliding seal may be attractive if production volumes are increased. It may also be possible to increase the working temperature of the mold well above the operating range of available top cover materials, which may be helpful when faster cycle times are required.

Additionally, without the use of the elastomeric surface of the top cover, actuators 28 and/or transfer plates 70 may provide a more controlled surface finish to the that side of the part. Actuators 28 may be simply machined and polished to the appropriate finish and directly act as the surface of the tool. Although there may be small zone witness lines, these residual marks should not be much larger than normal plastic parting lines, which are easily deflashed. More precise thickness control over the part could also be achieved since the thermal and mechanical distortion of the relatively soft top cover would no longer be a factor.

A variety of sealing methods are appropriate for this application. For instance, seal selection could depend on the bend radii (which is related to the zone geometry), the operating temperature and pressures, and the desired chemical resistance.

Standard elastomeric O-rings may be appropriate for creating a vacuum tight seal, and may, in some cases, be appropriate for primary resin seals. Standard solid polymeric seal materials such as Teflon, either spring or elastomer energized, could provide excellent chemical resistance and sufficient life at elevated temperatures. Braided compression seals infused with polymer could also be utilized. Where the geometry of the seal is complex or of tight radius, hollow elastomeric seals pressurized by a gas could be used to preload a polymeric or braided seal or as the primary seal. By maintaining the preload on the seal with gas pressure, the effects of varying tolerances caused by wear or geometry would be minimized. FIG. 17 shows the detail of a seal design with an upper o-ring vacuum seal 55 and a primary Teflon resin seal 57 energized with another elastomeric o-ring 59.

Pressure Actuators

An array of pressure actuators 28 is provided to selectively apply pressure to specific portions or zones 30 of the preform 24 or part being molded. These pressure actuators 28 may consist of pneumatic, hydraulic, electrically, or electromagnetically actuated systems, each of which applies pressure to a specific portion or zone 30 of the preform 24, typically via a pressure transfer plate 70. Preferably, the array of pressure actuators 28 is computer-controlled.

The array of pressure actuators 28 would typically be attached to a platen 60, and raising or lowering the platen 60 would raise or lower the array of pressure actuators 28. Thus, for instance pressure could be applied to the preform 24 by locking out any motion of each individual pressure actuator 28, and then simply lowering the platen 60. Alternatively, pressure could be applied to the preform 24 by locking out any motion of the platen 60, and then actuating one or more of the individual pressure actuators 28.

At the lower end of each pressure actuator 28 is typically provided a transfer plate 70. The transfer plate 70 may be rigidly attached to the pressure actuator 28, or the attachment may provide for one or more degrees of freedom. For instance, it may be desirably in some applications to attach the transfer plates 70 to the pressure actuators 28 via ball joints. Furthermore, if one or more degrees of freedom are provided for in the attachment, resistance to one or more of the allowed movements may be desirable. For instance, the ball joints may be preloaded.

The size, shape, and material of the transfer plates 70 are governed by, among other things, the geometry of the upper surface of the finished part 38, the possible need for complementary aligning of the edges of adjacent plates 70, including for instance, possibly interlocking edges, heat transfer and or thermal expansion considerations, and the required pressure to be applied to the preform 24. If the top cover 32 is stepped, as described above, the transfer plates 70 of the pressure actuators 28 might only need to be simple blocks, possibly machined out of aluminum or steel. If, however, the top cover 32 is not stepped, then the transfer plates 70 would preferably conform, or nearly conform, to the upper surface 44 of the top cover 32.

Alternatively, pads 48 that nearly conform to either the upper surface 44 of the top cover 32 or the top surface of the preform 24, if a top cover is not required, could be attached to essentially flat transfer plates 70. For instance, the pads 48 could be elastomeric pads that are glued, or otherwise fastened to the transfer plates 70. A stepped pad sheet could be molded in a manner similar to the manufacturing method described for the stepped top cover 32 above. This pressure actuator stepped pad sheet could then be cut into the individual pressure actuator pads 48, each of which would be glued to a flat transfer plate 70.

The stiffness of the pad material should be such that deformation of the pad 48 during the application of pressure to the preform 24 or molded part 38 does not result in inter-zone interference. Fatigue, wear, and thermal transfer properties are, as always, considerations in the materials selection process. Moreover, if during pressure cycling, the pads 48 rub against one another as the actuators 28 are raised and lowered, then the sliding friction between the pads must be minimized. Finally, the necessary tolerances or allowances between zones 30 may be influence by process requirements as well as top cover stiffness considerations. For instance, high temperature processes might require additional clearances to account for thermal expansion of the pads 48.

In some applications, it may be desirable to provide a mechanical locking interface between the pressure actuators 28. This locking interface would keep the pressure actuators 28 properly spaced and lined up, and further, could allow the pressure actuators to share side loads caused by mold curvature, as discussed below, and preloading of the pressure actuators, among other things.

It might also be desirable in some applications to provide temperature control of the pressure actuators 28, including possible temperature control of the pressure actuator transfer plates 70 and pads 48. Such active or passive temperature control of the transfer plates and pads could be provided in addition to, or instead of, any temperature control provided for the top cover 32. Temperature control of the pressure actuators 28 could allow for zoned temperature control, which may be desirable for the greater degree of control it provides over the infusion and curing process. In addition, the physical incorporation of temperature control mechanisms may be considerably easier in the pressure actuators 28, than when compared to the thinner top cover 32. A thermally transparent top cover 32 would enhance the contribution of any temperature control applied to the pressure actuators 28.

Any of a great variety of sensors 72, most particularly pressure and temperature sensors that would aid in controlling and monitoring the infusion and curing process, could be attached to the pressure actuator transfer plates 70, or, possibly more easily, molded into the pressure actuator pads 48.

The pressure actuators 28 must have sufficient travel to enable the top cover 32 to deflect enough to let the resin reservoir 36 fill. The amount of required travel depends upon, among other things, the stiffness of the top cover 32, the pressure applied to the preform 24, the size and shape of the pressure actuator 28, and part size and geometry. For instance, a stiffer top cover 32 would require less travel of the pressure actuator 28 than would a more flexible top cover 32. A large reservoir 36 may be desirable on a large part to shuttle resin 34 around, so a more flexible top cover 32 and greater actuator travel may be required. Furthermore, the pressure actuator 28 must have sufficient travel to adequately compress the preform 24 to its final desired fiber volume fraction.

The pressure actuators 28 will typically be mounted to an upper platen 60. The entire upper mold assembly 26 (including upper platen, pressure actuators, transfer plates, pads and top cover, if any, etc.) must be moved up at the end of each curing cycle to allow for part 38 removal. This raising and lowering of the upper mold assembly 26 may be done with an electrically-actuated ball screw, or a similar arrangement.

A production line incorporating the process of the present invention could consist of several lower molds 20 that are prepared and loaded outside the press 10, rotated into the press 10 for infusion and curing, then rotated out for part removal. In this case, a conveyance system would need to be created to move the lower mold 20 and preform 24 assemblies, including automatic connection of any heating/cooling lines, as well as automatic alignment of the lower mold and preform assembly with the upper mold assembly 26.

In a high volume production situation, a quick release system 74 that disconnects any control lines, heating/cooling lines, wires or other such lines from the pressure actuators 28, thereby facilitating the release of the actuators 28 from the platen 60 could ease repair and maintenance of the pressure actuators 28. Furthermore, for a press 10 that is to be used with a wide variety of molds, the capability to quickly and easily replace the pressure actuators 28, thereby adjusting the travel and/or load capacity of the system, is very attractive. Alternatively, providing pressure actuators 28 capable of being individually adjusted in situ could also be desirable. For instance, a friction and/or groove-based system, similar in operation to tongs for carrying steel ingots, could work effectively for adjusting the heights of the individual actuators 28. The adjustment could be done either at the mounting of the pressure actuator 28 to the platen 60 or in a connecting rod between the cylinder of the pressure actuator and transfer plate 70.

For a high production volume press, the transfer plates 70 would typically be rigidly attached to the pressure actuators 28, and the top cover 32 would typically be stepped. For a low production volume press, designed to operate with a variety of molds and top covers 32, the transfer plates 70 could be pivotably attached to the pressure actuators 28. Such a pivotable attachment could include a biasing element.

In some instances, a quick release attachment mechanism to couple the transfer plates 70 to the pressure actuators 28 may be desirable.

The benefits of the process of the present invention may be realized even when fairly large zones 30 are used to assist in the infusion of resin 34 through the preform 24. This might be particularly true for larger parts 38, parts 38 with very mild curvatures, or parts 38 with low fiber volume fractions. In these cases, zone groups might be defined, wherein each zone group consists of a plurality of zones 30, a continuous top cover portion, and a plurality of spaced pressure actuators 28. Within each zone group the areas in near proximity to a pressure actuator 28 would be locally stiff, but areas not in near proximity to the pressure actuators 28 would be somewhat more flexible. With several actuators across any one zone group, the zone group could be lowered all at once, or the pressure actuators 28 could be sequentially actuated to "roll" down across the surface of the part 38 being molded. Because the pressure actuators 28 within a zone group could be spaced apart, this technique would decrease the number of required actuators, but still give dynamic control of the resin 34 along more than one axis. This technique can be taken one step further, to the point where the actuators 28 could be attached directly into the top cover 32. As described above, the top cover 32 is typically flexible enough to allow for resin reservoir movement between the top cover 32 and the preform 24, but stiff enough to transmit the pressure needed for infusing resin 34 through a high fiber volume fraction preform.

During operation, the pressure actuators 28 must provide enough pressure to compact the preform 24 to its final fiber volume fraction, but not so high a pressure that it damages the preform 24. Zone size (area) and slope determine the axial output load of any given actuator 28. For a given axial output load, zones 30 that are sloped, i.e., zones with a normal to the surface that is at an angle to the central axis of the pressure actuator 28, will experience a lower pressure than zones 30 that are flat. Therefore, relative to zones that are flat, zones that are sloped will require a higher axial output load from the pressure actuator to reach the desired final fiber volume fraction. Thus, actuators having different output load capacities may be required to achieve a uniform fiber volume fraction throughout the finished part 38. Alternatively, finished parts having varying fiber volume fractions could be specifically designed and easily manufactured using the process of the present invention.

Moreover, applying pressure to zones 30 that are sloped will cause side loads to develop in the pressure actuators 28. The magnitude of these side loads is generally a function of the applied axial loads, the slope of the upper surface 44 of the top cover 32 or of the preform 24 or molded part 38, and the mechanisms used to couple the top of the pressure actuators 28 to the platen 60 and the bottom of the pressure actuators 28 to the top cover 32 or to each other. The pressure actuators 28 must be sized and designed to adequately carry these side loads.

Different mechanisms may be used for applying pressure to the part 38. The method outlined thus far has dealt mostly with a pressure actuators 28 applying a pressure to the preform 24, either directly or through a top cover 32. However, within the scope of the present invention, any other suitable mechanism may also be used. For instance, pressure could also be applied using inflatable bags that are appropriately sized and shaped, and which apply the pressure upon inflation.

Although the process of the present invention could be used with many forms of an actuated upper mold surface, the preferred actuation system incorporates a pneumatic solution. Compared to conventional processes, the process of the present invention is a low pressure molding operation. In general, pneumatic devices are typically cheaper and cleaner than hydraulic devices. The main drawbacks with using pneumatics would be generating sufficient pneumatic pressure to operate the pressure actuators at the required infusion and molding pressures, accepting larger pressure transients in the system, and compromising on the drastically rising costs of valves which can handle both higher pressures and flow rates. For instance, in order to achieve a typical design constraint of 400 psi pressure applied to the preform via the pressure actuator transfer plate, a considerably higher pneumatic pressure is needed in the actuating cylinder. Valves that can accommodate such high pneumatic pressures, such as 2-way 3-port directional solenoid valves or proportional servo valves are expensive.

An alternative to using such high pneumatic pressures is a multi-cylinder pneumatic cylinder design where several pistons are attached to a common shaft in a cylinder, thereby trading increased cylinder height for increased output force. For instance, a cylinder with four pistons running on 150 psi air can have the output force of a cylinder running on 550 psi air. One drawback is that it would be difficult to package a multi-cylinder pneumatic cylinder design into a production press, as the tall cylinders would take up too much space and result in higher bending loads on the press 10 itself. Another drawback of the pneumatic actuator is that when the actuator must travel a certain distance before coming into contact with the top cover or preform and applying the desired pressure, the volume of the cylinder that must be filled to make contact is filled with high pressure air which is doing no work. This inefficiency would greatly increase the air consumption of the process.

An alternative to implementing an all-pneumatic solution is to shift to the use of hydraulics. With hydraulics, the increased pressures available mean that no force multiplication would be needed, and the packaging of the actuator would be simplified. One embodiment could involve the integration of the bearing surface and the hydraulic cylinders into the actuators. The outer diameter of the inner cylinders would function as a plain bearing, sliding inside a ground cylinder that is attached to the moving actuator surface. This embodiment would result in a considerable amount of bearing area and minimal bending moments, solving one of the main problems encountered in use of very tall, high force pneumatic actuators.

The problem with an all-hydraulic solution is the need for controlled pressure in the actuator over its travel range. This is easy to achieve with pneumatics, as air is a compressible media and a small change in travel results in only a small change in pressure. With a hydraulic cylinder a small change in the position of the piston can result in the pressure in the cylinder dropping to zero (since the hydraulic fluid does not expand), making it very difficult to maintain a controlled pressure over the full stroke if the desired actuator pressure differs from the supply pressure. This problem is usually addressed with the use of a hydraulic accumulator, which simply consists of a pneumatic pressure source acting upon a hydraulic fluid reservoir.

A hybrid pneumatic/hydraulic system 80, as shown in FIG. 1, was designed to provide efficient hydraulic power at the correct pressures. Because the bulk of hydraulic fluid supplied to an actuation cylinder 82 of the pressure actuator 28 would serve only to move the actuator transfer plate 70 into contact with the top cover 32 or preform 24, a dual pressure system could be used. A low pressure pump 84 could be used to move the actuator plate 70 into contact with the top cover 32 or preform 24. When this occurs the system 80 would then switch to the high pressure supply. High pressure fluid (up to 2000 psi) could come from a pneumatic booster arrangement. Two cylinders could be coupled together, the first, a pneumatic cylinder 86, which actuates upon the second, a hydraulic cylinder 88. Thus, for instance, if the area ratio is 20:1, a boosting 100 psi shop air could result in a 2000 psi hydraulic pressure. The resulting system would provide the compact actuation of hydraulics with the precise pressure control of the pneumatics. The two stage hydraulic system would also provide for increased efficiency, as high pressure fluid would not be wasted in moving the actuators into contact with the top cover 32 or preform 24.

Lower Mold

Concerns regarding the design and fabrication of the lower mold 20 used in the process of the present invention are similar to the concerns for the molds used in the SMC process. Stiffness of the mold is a key issue that impacts both the geometry of the mold and choice of material. Hardness of the mold material is another key concern when designing for large production volumes. Heat transfer capacity through the mold surface is important, as the lower mold 20 will generally be use for thermal control of the process. Compatibility of the mold material with the resin systems is also a concern, and although a typical steel mold is generally compatible with most resins, other mold materials could cause problems. Finally, as with all molds, cost, ease of manufacture, and availability of materials are also important considerations.

Typically, temperature control systems are designed and manufactured right into conventional molds, and the lower mold 20 of the present invention is no exception, in that the lower mold is the most likely avenue for the addition and/or removal of heat during the infusion and/or curing processes. A variety of techniques could be used to provide the lower mold 20 with temperature control. For instance, steel, metal, or other machinable molds could be provided with interior machined cooling lines. Alternatively, temperature control could be provided by cross-drilling honeycomb backing material. The sandwich construction, typically, aluminum honeycomb, adds stiffness relative to a solid plate having the same weight, and cooling or heating air could be passed through the cross-drilled passages to aid in heat transfer. Other temperature control schemes generally known to persons of ordinary skill in the art could also be suitable.

The curvature of the mold affects many other aspects of the press 10. In general, a mold having less steep slopes or curvatures is desirable. As curvature increases, the effective area of a zone 30 increases, so that the pressure applied to the preform 24 by a given force in the pressure actuator 28 decreases. Additionally, a steeper slope creates higher side loads on the actuator as well as the surrounding zones. Greater curvature also increases the chance for slippage against, or smearing of the top cover 32 by the pressure actuators 28, as discussed above.

As with the top cover 32 described above, a wide variety of sensors may be provided with the lower mold 20. Temperature, pressure, humidity and other sensors could be used to monitor and control the infusion and curing process. Many such sensors could be mounted into machined areas on the surface of the lower mold 20. Other sensors could be molded into the top cover 32, or even onto the individual pressure actuators 28. Alternatively, the sensors could simply be molded into the surface of a composite mold.

Preforms

The process of the present invention was originally conceived to address problems with infusing fibrous preforms in liquid composite molding. However, the present invention is equally valuable in all liquid molding operations and does not require that a preform 24 be used to take advantage of its rapid resin distribution capabilities. Preforms typically consist of a fibrous reinforcement for a composite part and a binder or other agent to help the fibers maintain their shape and orientation during handling. A preform may also contain surface veils, inserts, cores, ribs, or any other items needed in the final part.

The process of the present invention makes no assumptions as to the material or assembly process of the preform 24. Preforms may range from porous solids to vacuum and anything in between that needs to be infused with a liquid.

Injection of the Resin System

Injection of the resin 34 into the reservoir 36 formed between the preform 24 and the top cover 32 preferably may be accomplished by an injection machine having variable ratio capabilities. Variable ratio capabilities give the injection machine the flexibility to inject many different resin systems. Typically, the only limitation on such a machine is its ability to inject polyurethanes, which require a different setup than most other resins. However, the likelihood of using polyurethanes in a production environment is low, and a limitation on the injection machine is not a limitation on the practice of the present invention.

Generally, injection of the resin 34 can be either of the reaction injection molding or resin transfer molding variety, depending on the requirements of the resin system. The selection of a particular resin system is generally based on processing parameters, end use application characteristics, cost, and availability. The process of the present invention can accommodate almost all known resin systems: fast and slow curing resin systems, high and low viscosity resin systems, endothermic and exothermic curing resin systems, and all resin systems in between.

In some instances, the thermal characteristics during curing of a particular resin system may govern the required temperature capabilities of the mold.

Furthermore, the process of the present invention places essentially no limitations on additives or fillers included in the resin system, although preferably the process will be practiced with a resin system having adequate mold release characteristics. Some resin systems have excellent inherent mold release characteristics, while others require additives to improve their mold release characteristics. Fillers can reduce the cost of the resins, and other additives can drastically improve the surface finish.

Preferably, a vacuum pump would be provided to evacuate the mold cavity. The location and number of vacuum ports are design variables that a person of ordinary skill in the art could determine. The use of a vacuum pump requires that the mold cavity be sealed. As discussed above, several options exist for sealing the top cover 32 to the lower mold 20.

Also, in general, the top cover 32 will provide a seal between the pressure actuators 28. However, since some implementations of the process of the present invention may not use a top cover 32, seals separate and distinct from the top cover 32 may be needed between the individual pressure actuators 28 to prevent the resin 34 from leaking out.

Pultrusion

The process of the present invention is easily adaptable to a pultrusion process. In such a pultrusion implementation of the process of the present invention, a pultrusion die could be divided into several zone groups with each zone group segmented into zones controlled by individual actuators. Rather than move the reservoir 36 over the preform 24 as in the process of the first embodiment, in pultrusion the preform 24 would be pulled past the reservoir 36. The pressure actuators 28 in each zone group would provide similar actions as in the process as described in connection with the first embodiment: preform clamping to prevent resin flow, infusion, reservoir transfer, and compaction to a final fiber volume fraction.

The process of the present invention as applied to the pultrusion process could reduce the load required to pull the finished product from the die by either reducing the clamping load in the die or by moving the zones with the part. The lower pulling forces would allow larger cross sections with greater surface area to be pultruded.

Pulling loads are not constant in traditional pultrusion. When a roll of reinforcement material runs out, the next roll must be spliced to the end of the previous roll. To ensure continuity and strength in the final part, the ends of the two rolls must be overlapped. The temporary increase in thickness due to the overlap increases the drag load through the fixed width pultrusion die. The process of the present invention as applied to the pultrusion process is pressure controlled rather than volume controlled and maintains constant clamping and drag loads on the part. A stable drag load allows the part to be pulled more evenly, consistently, and predictably.

Importance of Process Variables

The advantage of the process of the present invention over competing production processes is its ability to more quickly produce more uniform parts of more complex shape, with denser and more complex reinforcement. To achieve this, active control over both the resin 34 and preform 24 is exercised. The specific source of this control is the ability to apply different pressures to different sections of the preform 24.

The differential application of pressure to the preform 24 is the key to controlling the flow of the resin 34. Actively controlling the flow is the only way to guarantee rapid filling of complex molds and preforms. Moreover, active control enforces uniformity in the fill process. Finally, active control allows the process to be optimized in concert with a simulation of the fill process, because it allows one skilled in the art to force the resin 34 to flow only in easily predictable ways.

According to Darcy's law, the factors that determine the direction and speed of resin flow are the pressure gradient in the resin, the permeability of the medium in which the resin is flowing, and the viscosity of the resin. Active control over the pressure applied to the top of the preform 24 allows a large amount of control over the first two of these parameters, and a lesser degree of control over the third.

Increasing the pressure applied to a zone 30 when that zone is not fully infused but has resin 34 infusing into it from above will create a pressure gradient that will quickly drive the resin 34 through the thickness of the preform 24. Applying different pressures to two neighboring zones 30 that are fully infused will cause resin 34 to flow between zones through the plane of the preform 24; quickly cycling the direction of the in-plane pressure gradient will mix the resin 34 at the zone boundaries and could be done to prevent weld lines and other defects, as discussed above. There is also a natural pressure gradient between resin 34 and the vacuum.

The permeability of a section of preform 24 can also be manipulated by the pressure applied to that section. This allows zone-by-zone control of the resistance the preform 24 offers to resin flow, and thus provides another, equally important mechanism for controlling where resin goes and when. Resin 34 can be discouraged from moving into a dry zone by clamping down on the zone 30 with a high pressure.

These two mechanisms, the use of a pressure gradient to quickly drive resin 34 through the thickness of the preform 24, and the clamping of a dry preform to control flow paths, are what enable the process of the present invention to achieve both its low cycle time and its quality control, even for complex parts. Better structural properties result because the process of the present invention can infuse parts with a very high fiber volume fraction. Because zones 30 are infused through the thickness of the preform 24, and the infusion starts in a zone while it is not under high pressure and thus has a high permeability, zones 30 infuse quickly. Moreover, the zone 30 can be compressed to a very high volume fraction while it is being infused.

There are several pressure related issues that must be considered. The pressure must be high enough to infuse resin 34 quickly into the preform 24. The holding pressure on dry preform zones 30 must be enough to render the zones relatively impermeable without damaging the preform. The pressure applied to different zones must not differ so much as to cause the resulting final infused preform thickness to vary to much. Variations in pressure between zones could result from the fact that a zone's projected area (to which a pressure actuator 28 applies force) will sometimes be different from its actual area.

Knowing the viscosity of the resin systems is important in order to furnish physical property data to the flow simulation. Viscosity depends on temperature, shear rate (which is a function of how fast the resin is flowing, which is in turn influenced by the pressure gradients introduced by the actuators) and cure state.

Process Variable Ranges

The process of the present invention can support a wide range conditions during the molding process. Below is a table of variables and the typical operating ranges over which the process could operate. This table is not meant to limit the ranges of the variables over which the process of the present invention could operate, but only to provide an understanding of typical operating ranges.

| Variable | Range | Units |
| --- | --- | --- |
| Pressure | 14–500 | psi |
| Temperature | room-500 | degrees F. |
| Viscosity | 1–30000 | centipoise |
| Permeability | any- from the lightest veil to impermeable inserts | cm$^2$ |
| Fiber Volume Fraction | 10–75 | percent |

A high temperature version of the process is possible, if the top cover is replaced with seals between the pressure actuators. For instance, with a ceramic mold and ceramic pressure actuators, molten metals could be processed at temperatures of up to 2600° F.

For special applications, a higher pressure is possible, but the low cost advantages of the process of the present invention begin to diminish above about 450 psi because of increased complexity and size of the actuation system, molds, and press.

Control System Hardware

For the process of the present invention, any system which can individually control the pressure actuators 28 in the array of pressure actuators is sufficient.

Figure 12:
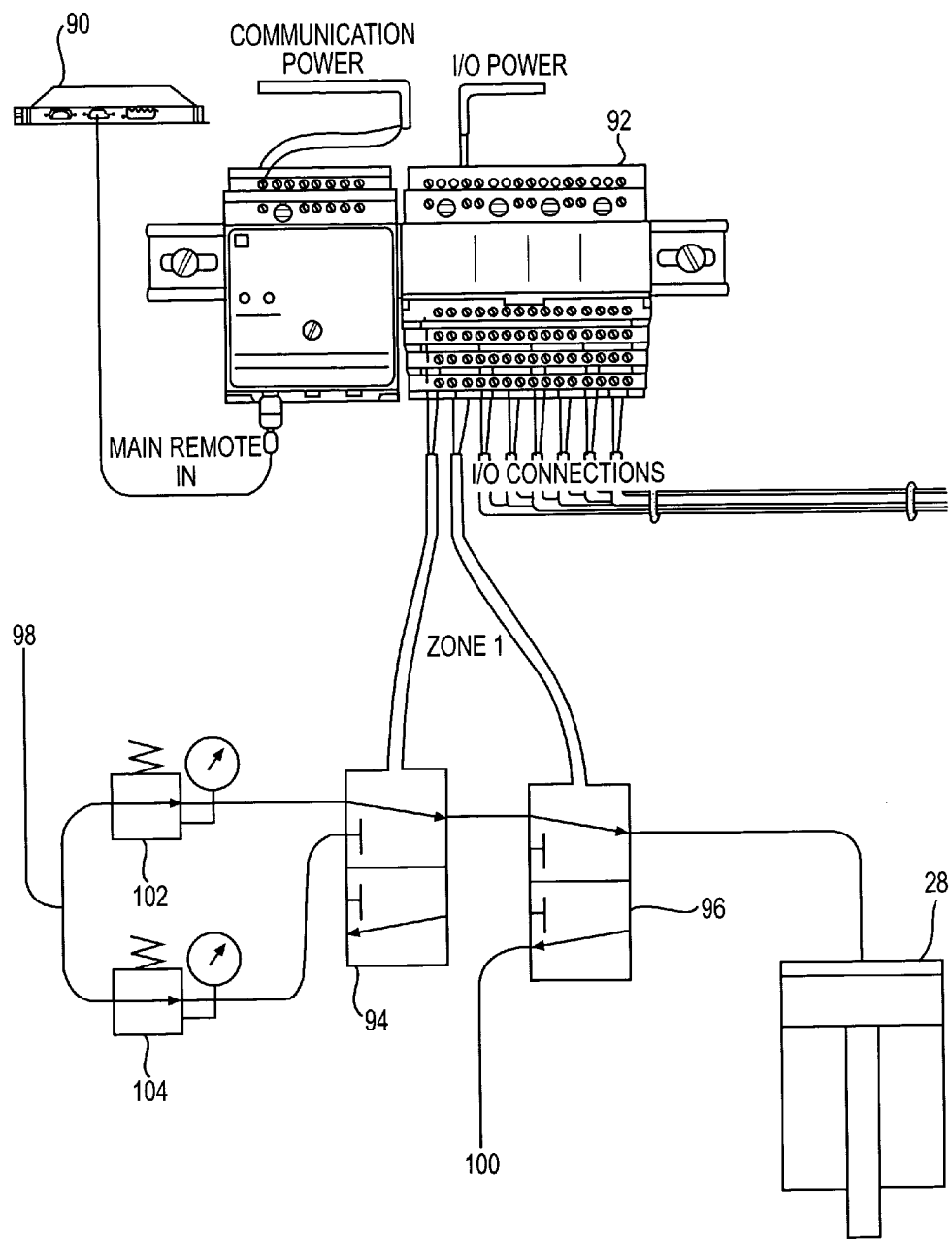
FIG. 12 shows how the Interbus® controller card and output module are connected to the valve system to allow computer controlled switching between two regulated pressures.

In one embodiment, a PC-based control bus has been implemented on the zoned pressure molding press 10 of the present invention. As implemented, this PC-based control bus is based on the German company Phoenix Contact's Interbus® system. Although the control software has been abstracted to an extent that the control hardware can be easily changed at any point, the Interbus® system is probably the industrial control network that is most compatible with the zoned pressure molding of the present invention at this time. Interbus® also makes a large variety of industrial I/O modules, PLC interfaces, motor starters, etc. that could make any future modifications to applications of the present invention much easier to implement. As shown in FIG. 12, the zoned pressure molding press control system hardware, could consist of a controller card 90 and an input/output module 92 connected to and controlling valves, such as pressure selector valves 94 and zone on/off valves 96. The valves, in turn, control the pressure actuators 28.

As presently implemented, the control system hardware consists simply of a standard WINTEL® PC with an Interbus® controller card (IBS PC ISA SC/1-T) with a cable connecting it to a module with sixteen (16) digital outputs (IB STME 24 DO 16/3). This module is basically a station with 24V DC relays that energize by command of the controller card. Zone actuation is achieved when solenoid valves are wired to the output module. In this particular application, 24V DC solenoid valves manufactured by SMC were used. Multiple applied pressures were needed to properly identify parameters that effect part quality. With the balanced spool of the NVS 3114, both pressure supply ports 98 and exhaust ports 100 can be pressurized and used to select one of two preset pressures. The two pressures were set by pressure regulators, a low pressure regulator 102 and a high pressure regulator 104, and distributed to the selector valves 94 by a manifold 106. The selector valves then transfer pressurized air to the NVS 3115 valves which turn the respective press zone valves on and off, supplying the load to the actuators. All together, this pneumatic system allows computer control over three states of a zoned pressure molding actuator (low, high, or off). As implemented, the maximum designed pressure the actuators are to apply is 500 psi. Since all of the pneumatic system components on the press are only rated to 150 psi, a pair of 3" bore,1" stroke Bimba cylinders were coupled to apply 500 psi to one zone.

The Interbus® is also expected to perform other functions besides that of zone actuation. For instance, as implemented, a vacuum cut-off valve 108, which supplies vacuum to the preform 24 through a port 110 in the lower mold 20, could also be wired into the output module 92 of the press 10. If a more automated zoned pressure molding press 10 is desired or needed, the Interbus® system would be quite capable of also controlling, among other things, the vacuum pump, press platen movement, mold loading and unloading, as well communication with robotic preform loading and part unloading stations.

Figure 13:
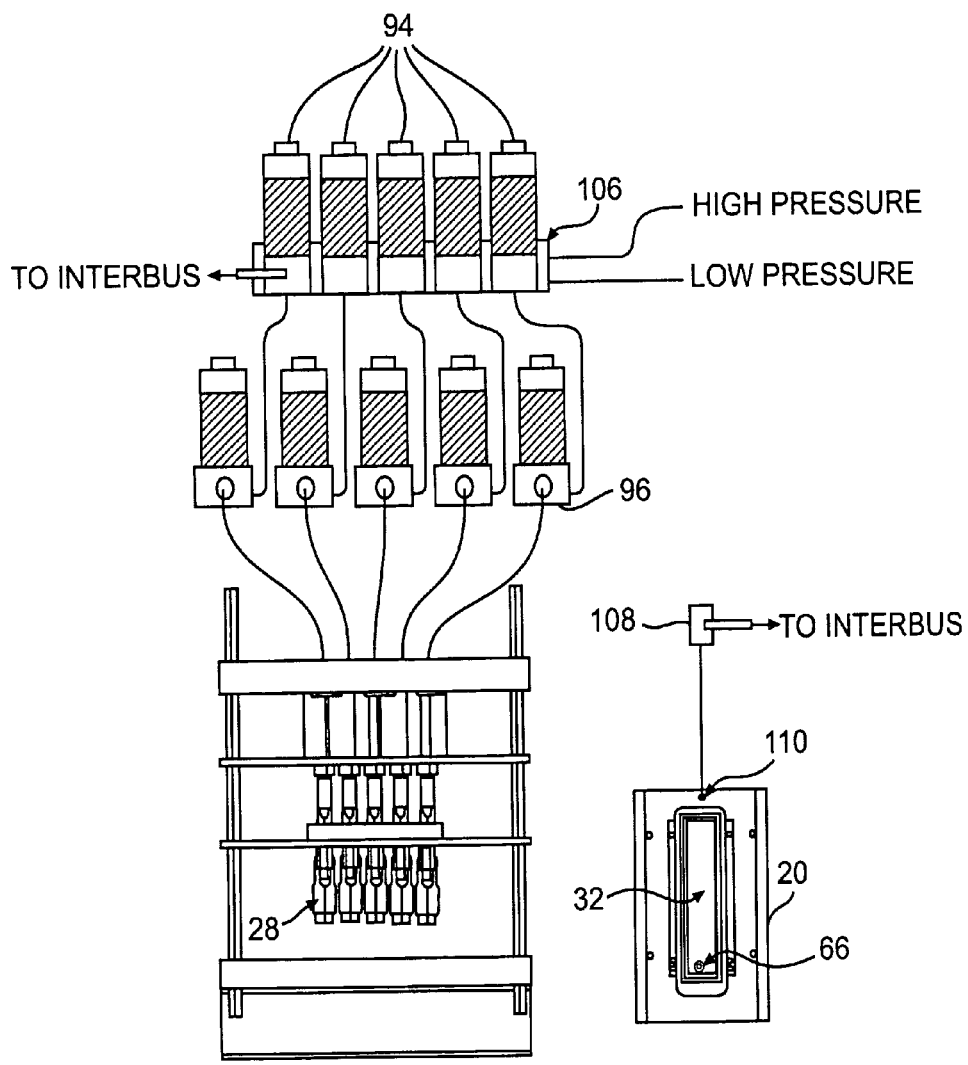
FIG. 13 is a schematic of a zoned pressure molding press setup.

FIG. 12 shows how the Interbus® controller card and output module are connected to the valve system to allow computer controlled switching between two regulated pressures. FIG. 13 shows the present implementation in the zoned pressure molding test press.

This Interbus® system uses binary pneumatic valves, which makes the Interbus® system probably the fastest available system for large numbers of digital outputs. The Interbus® system was also considered because it is compatible with any valve manufacturer, and thus does not narrow valve selection like some of the other fieldbus systems. The primary known drawback with Interbus®, and any other fieldbus system, is that the analog-to-digital conversion takes place out on the bus and is then transported along the common communications line to the central processor. This means that analog signals are restricted to low sample rates which may restrict the response of some feedback systems. To overcome this drawback, a data acquisition system could be incorporated whereby the analog signal could be transported along a dedicated signal line to the processor.

A press 10 that can implement the process of the present invention will support a variety of sensors, including for example, those that measure: pressure, in the mold or in the actuation system; temperature; resin flow front position; and cure. The sensors could be used for diagnostic purposes, and also for active feedback during the molding and curing operations.

Control Software

The functional control program software, which will control the production press for implementing the process of the present invention, could contain the following logical components:

First, there could be a bus control module, i.e., a module that handles the specifics of communicating to the press hardware via a communications bus. For example, a module for controlling the INTERBUS bus could be provided in the press control program.

Second, there could be modules that hide the specific bus operations needed to control any particular press hardware behind more logical operations. For example, in the press control program, there could be a logical construct for valves, which could be used to turn valves on or off without worrying about the exact commands that must be sent over the bus in order to do that, or even what bus system is in use.

Third, there could be a similar module to further remove the logical operation of a press zone from the underlying hardware operations necessary to perform desired zone actions.

Fourth, there could be a module that handles the specifics of converting the analog signals from sensors into digital data. For instance, a module for controlling data acquisition boards could be provided in the press control program.

Fifth, there could be a further layer of abstraction to represent various sensors, regardless of the underlying DAQ system.

Sixth, there could be a module to handle the logging of actuation sequences and sensor data for each part that is produced.

Seventh, there could be a module that uses sensor input to determine if the press is in working order or if it fails during operation.

Eighth, there could be a rich language for controlling zone states and sensors with respect to time. Such a language would allow control over individual zones and would also have higher-level commands for filling multi-zone regions. The language could incorporate branching based on sensor input, as well as repetition of action sequences.

Finally, there could be other software developed for interfacing with infusion and/or curing simulations, generating the actuation program, etc.

As currently implemented, the press control software, for a lab-scale zoned pressure molding, allows user:
- to control the pressure applied to the part by the zoned pressure actuators manually or with a script;
- to toggle the vacuum port and the vacuum pump manually or with a script;
- to log all zone movements, whether accomplished through manual or scripted control; and
- to set all of the press zones to their off state in an emergency.

Also, as currently implemented, the press control software is written in Microsoft Visual Basic®, a computer programming language with object-oriented features. It contains classes, which satisfy the following purposes:
- bus abstraction;
- press component abstraction;
- Script interpretation and execution;
- zone logging; and
- user interface.

Additionally, as presently implemented on the lab-scale zoned pressure molding press, the software contains classes that abstractly represent the Interbus® controller and the Interbus® devices to which the press hardware is attached. The bus control classes handle all communications with the bus system, using the Interbus® driver to send commands to the Interbus® controller card. The classes make the proper calls to build the configuration frame for the connected Interbus® devices at start-up. They also write process data to the devices during press operation, which in turn causes the press hardware to respond. The lab-scale zoned pressure molding press uses two Interbus® devices, the Interbus® Test Drive Kit controller and digital output module and a conventional Interbus® digital output module. It is easy to add or subtract from the Interbus® configuration that controls the press and to reflect these changes in the software. The bus classes, while implemented in Visual Basic®, could easily be implemented in a variety of languages.

Figure 14:
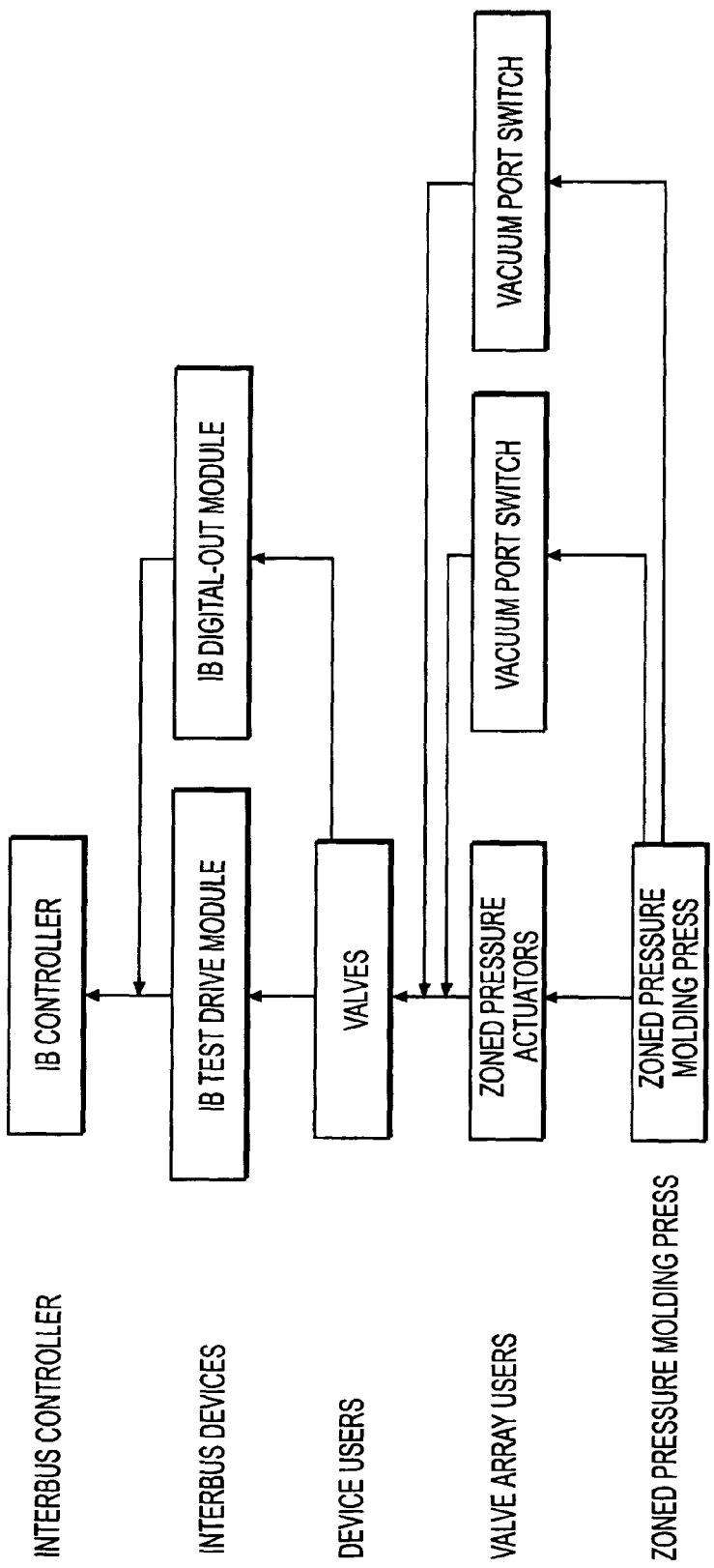
FIG. 14 is a diagram of the distinct layers formed by the bus and press component classes, and the usage relationships between the classes.

Also, as presently implemented on the lab-scale zoned pressure molding press, the software contains classes that abstractly represent physical press components: valves, zoned pressure actuators, toggle switches for vacuum control, and the complete press itself. The class that represents an array of valves directly uses the bus control classes. The class that represents an array of zoned pressure actuators uses the valve array class, because each zoned pressure actuator is controlled by individually controlling two valves. The class that represents the press uses the zoned pressure actuator array and toggle switch classes. Such abstractions are necessary because they ensure future control software extensibility. Moreover, because commands pass through several layers, it is possible to make changes to how the software works at different levels without impacting the entire program. It is also possible to add new hardware, such as sensors, to the zoned pressure molding press and to reflect that easily in the software. Like the bus control classes, the press component classes could also be easily implemented in a variety of development environments. FIG. 14 is a diagram of the distinct layers formed by the bus and press component classes, and the usage relationships between the classes.

Also, as presently implemented on the lab-scale zoned pressure molding press, the software contains classes that interpret and execute Zoned Pressure Molding Language (ZPML) scripts. The script interpreter class reads a file containing a ZPML script and parses the text. The result is ZPML machine code, an array of integers representing commands to be sent to the press. A separate class executes the ZPML machine code, issuing the proper commands to the class representing the ZPM press.

The format of a ZPML script is:
SCRIPT
  [statements]
END

A statement can be either an ACTION or a WAIT. The format for a WAIT statement is:
  WAIT n where n is the number of milliseconds to wait before executing the next statement. The format for an ACTION statement is:
  ACTION {ZONES|VACUUM}
    statement body
  END The statement body for an ACTION ZONES statement assigns pressures to specific zoned pressure actuators, using one or more lines of the following format:
  ZONE row column {OFF|LOW|HIGH} where row and column specify the zoned pressure actuator in the two-dimensional zoned pressure actuator array. The row and column indices for a zoned pressure actuator array start at zero. The statement body of an ACTION VACUUM statement specifies which vacuum element to toggle, the port switch or the pump switch, using a line of the following format:

{PORT|PUMP} TOGGLE

White space and indentation within scripts is ignored by the parser, but may be included for readability.

For instance, here is an example of a script that toggles the vacuum port, waits two seconds, and then sets the second and third actuators in the first row of a zoned pressure actuator array to high pressure. It should be noted that, while ZPML supports a two-dimensional array of zones, the lab-scale zoned pressure molding press has just one row of five zones. Both the ZPML script and ZPML machine code are designed to be extensible for future press control needs.

```
SCRIPT
    ACTION VACUUM
        PORT TOGGLE
    END
    WAIT 2000
    ACTION ZONES
        ZONE 0 1 HIGH
        ZONE 0 2 HIGH
    END
END
```

As implemented, the software contains classes that can log when zones are commanded to change pressure. The user can turn the log on and off, and save the log to a file.

Figure 15:
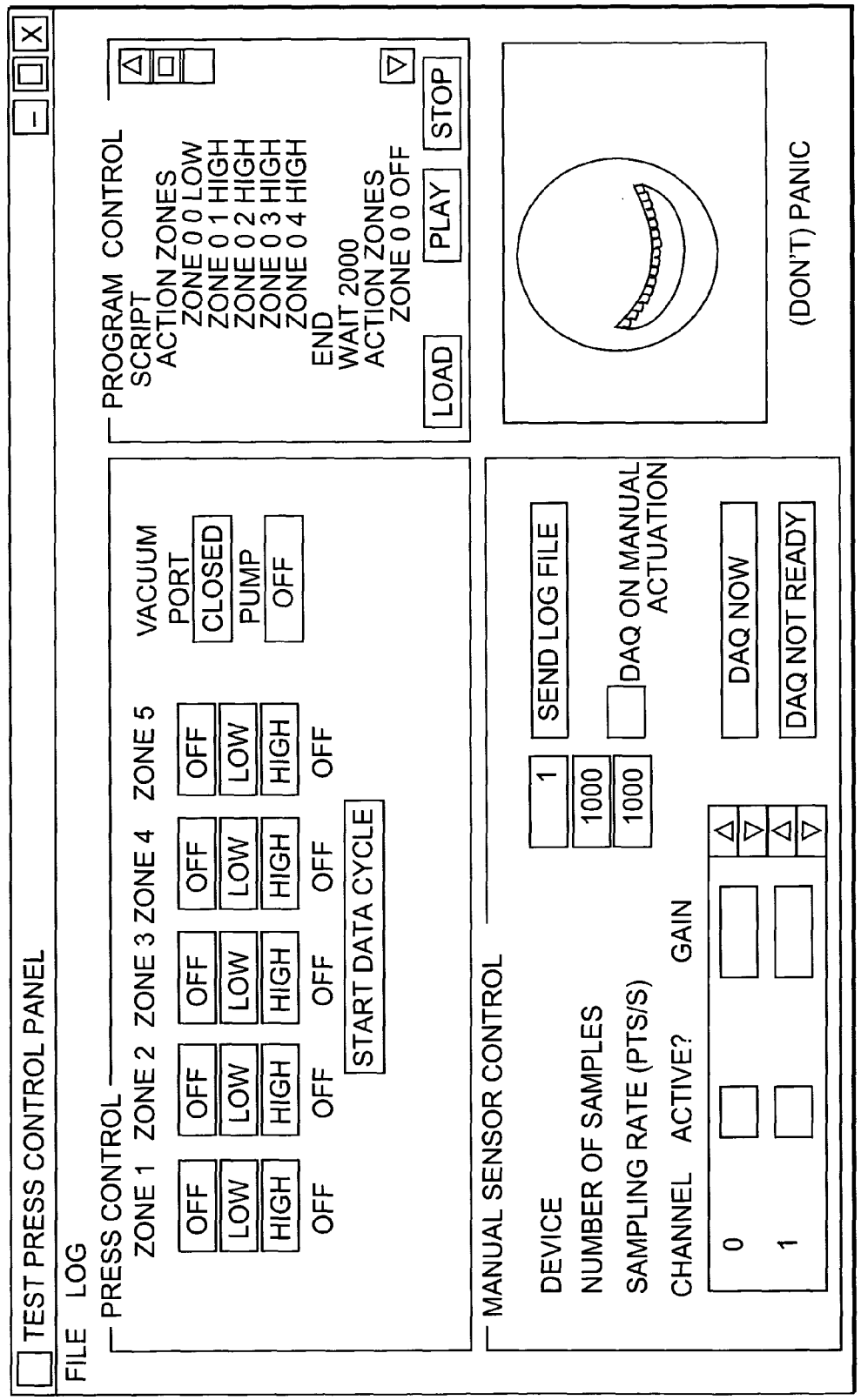
FIG. 15 is an example of a Press Control Panel from the user-interface.

Finally, as implemented, the zoned pressure molding press includes a user-interface. The user-interface contains controls for the manual actuation of the five lab-scale zoned pressure molding press zones and toggling the vacuum port and vacuum pump. The user can click on the appropriate command button to set a zone to a state of "off," "low pressure," or "high pressure," or to toggle the vacuum port and vacuum pump. FIG. 15 shows the Press Control Panel from the user-interface as currently implemented. The user-interface also contains controls to allow the user to load, execute, or stop a script using the Press Control Panel.

Practical Implementation

The zoned pressure molding process of the present invention has been demonstrated on a small scale in the preparation of 2" by 10" test coupons. The test press (shown in FIG. 13) consists of five actuators of 2" by 2" size. The actuators are modular, and can have a variety of zoned pressure actuators attached. For initial coupon production, machined blocks of mahogany were used to apply pressure to a flexible top cover. The top cover is made of 0.030" thick silicone rubber and is simply clamped to the mold to form a seal. The mold is a plate of aluminum with a 2" by 10" channel cut out of it which has been glued with silicone to a 1" thick glass plate which forms the lower half of the mold. The glass allows monitoring of the flow front with a video camera.

The preforms that have been used for the initial testing are made up of five layers of PPG 3 oz random strand mat. This material is difficult to process to high volume fractions and is sensitive to damage by excessive pressure. It is very similar to the preforms that are expected to be used with the zoned pressure molding process of the present invention for mass production. The coupon tests were used to find the process limits for this material.

The resin used in the coupon tests is a heavily promoted, room temperature curing polyester system from Interplastic Resin Corporation. The system was chosen for room temperature cure to allow the use of an unheated, glass bottom mold for flow analysis, and for its very fast curing. With the appropriate catalyst percentage, the system has a gel time ranging from 30 seconds to 8 minutes, allowing the simulation of very fast cycle time resins that would be used in a mass production application, while also allowing slower and more careful experiments with specific flow regimes.

A typical production run for a coupon consists of the following steps.

High and low pneumatic bus pressures are selected and manually adjusted;
Preform is prepared by cutting 2" by 10" strips from a roll of mat and stacking them;
Mold is waxed to allow part release;
Appropriate resin mixture is prepared but not catalyzed;
Injector, top cover and cover plate are attached;
Vacuum pump is started;
Vacuum is created within the preform through the mold vacuum port;
Mold is loaded into the press;
Actuation sequence/recorder is loaded in the control software;
Resin is catalyzed and mixed;
Syringe is filled with mixed resin and connected to the injector;
Video camera is started;
Resin is injected through the top cover;
Injector is closed and locked;
Computerized actuation sequence is begun;
Vacuum valve is closed;
Part cures;
Actuators are released; and
Top cover is unclamped and the part is removed.

After part removal, the only preparation needed to run another coupon is the cleaning of the mold glass and the top cover. With a successful run, there is usually minimal or no residue to remove.

For a typical coupon test, the following parameters are used:

Preform: five layers PPG 3 oz random strand mat;
Resin: Interplastic CoRezyn COR 40-B2-8099;
Catalyst: 1.75% by weight Norox MEKP;
Volume of injected resin: 27 cc;
High bus pressure: 50 psi (resulting in 175 psi at the actuator);
Low bus pressure: 30 psi (resulting in 105 psi at the actuator);
Mold temperature: 72 degrees F.;
Resin temperature: 72 degrees F.;
Resin viscosity: approximately 200 centipoise; and
Gel time: 2:30 (min:sec).

The following actuation program is used to control the infusion of the test coupons. The ZPML script holds the zones not yet infused at high pressure while the infusion of the other zones takes place. When shuttling the resin reservoir from one zone to another, this script releases pressure in the adjacent zone and the reservoir, then reapplies pressure to the reservoir to provide for a more controlled movement from zone to zone and to minimize the pressure spikes in the pneumatic system. The time that the pressure is held on the reservoir at each zone is varied to account for the increasing viscosity due to any crosslinking of the resin.

```
SCRIPT
    ACTION ZONES
        ZONE 0 0 LOW
        ZONE 0 1 HIGH
        ZONE 0 2 HIGH
        ZONE 0 3 HIGH
        ZONE 0 4 HIGH
    END
    WAIT 2000
    ACTION ZONES
        ZONE 0 0 OFF
    END
    WAIT 100
    ACTION ZONES
        ZONE 0 1 OFF
    END
    WAIT 500
    ACTION ZONES
        ZONE 0 0 LOW
    END
    WAIT 8000
    ACTION ZONES
        ZONE 0 1 LOW
    END
    WAIT 2000
    ACTION ZONES
        ZONE 0 1 OFF
    END
    WAIT 100
    ACTION ZONES
        ZONE 0 2 OFF
    END
    WAIT 500
    ACTION ZONES
        ZONE 0 1 LOW
    END
    WAIT 10000
    ACTION ZONES
        ZONE 0 2 LOW
    END
    WAIT 3000
    ACTION ZONES
        ZONE 0 2 OFF
    END
    WAIT 100
    ACTION ZONES
        ZONE 0 3 OFF
    END
    WAIT 500
    ACTION ZONES
        ZONE 0 2 LOW
    END
    WAIT 12000
    ACTION ZONES
        ZONE 0 3 LOW
    END
    WAIT 4000
    ACTION ZONES
        ZONE 0 3 OFF
    END
    WAIT 100
    ACTION ZONES
        ZONE 0 4 OFF
    END
    WAIT 500
    ACTION ZONES
        ZONE 0 3 LOW
    END
    WAIT 16000
    ACTION ZONES
        ZONE 0 4 LOW
    END
    WAIT 2600
    ACTION VACUUM
        PORT TOGGLE
    END
END
```

The result is a part cured to 58–64% volume fraction, having tensile strength ranges from 40–50 ksi and modulus from 2.5–3.2Msi. These are all extremely good values for random strand mat and polyester resin.

Factors Affecting the Process

One of the benefits of the process of the present invention is that it is a composite liquid molding process, and thus, in terms of press hardware, the press loads are greatly reduced over almost all other non-liquid molding press operations. Hardware costs are reduced due to the reduction in platen size and the lower cost of the pressure actuators. However, with the process of the present invention, many very small independent actuators are required. Thus, the reduced hardware cost comes at the price of increased process complexity. The infusion process is no longer a simple on/off operation, but now involves specific pressure actuator sequences, possibly with many changes in the loads applied by each actuator during any given process cycle.

On the other hand, this increased control complexity can be transformed into increased process control. The application of a given pressure at a given point during the process can depend on many different factors. These factors can be grouped into four basic groups, all of which are, to some extent, governed by the specific resin infused into the preform.

The first group of factors is primarily concerned with fiber volume fraction control. Ease of reservoir movement can be facilitated with very small, if not zero, pressure, but the infusion and final holding pressure can easily reach aerospace autoclave pressures. In specific zones constant pressure on the reservoir could be maintained to account for reservoir loss through induced RTM-type flows, i.e., flows through the plane of the preform. Neighboring zones could maintain a lower pressure to increase porosity and decrease infusion time in those RTM areas. Constant pressure boundary conditions could also assist in retaining a proper load during part shrinkage.

The second group of factors is primarily concerned with the trade-offs between process speed and preform damage. The resin reservoir can be moved easily around above the preform by releasing the pressure, possibly to zero, in the zone or zones where the resin reservoir is desired, while maintaining or supplying pressure to the zones where the resin reservoir is not desired. Duration of infusion through the thickness direction can be reduced by increasing the pressure applied to the zones containing the resin reservoir. Preferably the zones adjacent the reservoir zones maintain some pressure to hold the preform in place, decreasing the porosity in these adjacent zones and inhibiting RTM-type flow, and thereby keeping the resin reservoir from moving out of its current zones. This load on the neighboring "dry" zones may need to be limited so that the preform, whether the individual fibers or the preform architecture, for instance, is not damaged. Although the preform in the reservoir zones is under a higher pressure, it is loaded hydraulically and thus, would not be damaged as easily as the "dry" preform. Also, after infusion, the final holding pressure may need to be limited so as not to damage the preform. In any case, cycle time could be decreased by increasing the applied pressure in certain areas and at certain stages of the process, limited by preform and correspondingly final part damage.

The third group of applied pressure parameters is concerned with the preform type. Glass or carbon fiber, impermeable cores, various geometries, etc. can all be accommodated within the process of the present invention. The specific application of the process of the present invention will determine the actuation scheme. Dry preform holding pressures can differ depending on the strength of the preform. Furthermore, the viscosity of the unfused resin may require increased reservoir pressures for through-thickness infusions and to induce RTM-type flows. RTM-type flows could also be used to infuse beneath impermeable cores, inserts, and other special inclusions. Large variations in the properties of the preform and the correspondingly wide range of desirable applied pressures could also be accommodated using the process of the present invention due to the array of independently controllable actuators. Although large preform variances would not necessarily lead to cost effective manufacturing, the process of the present invention would still able to accommodate them.

The fourth pressure parameter group would be those parameters specific to a given mold. This group would include factors such as the increase in applied surface area, and the corresponding reduction in applied pressure for a given axial load in a pressure actuator, due to curvature of the mold. The contours of a mold also create side thrust loads between neighboring pressure actuators, thereby increasing the frictional loads between actuators, and possibly causing pressure actuator bearings to seize or even drastic misalignments of the pressure actuator's transfer plates.

Layout of a Press

The layout of a press for practicing the present invention will be primarily determined by the specific implementation of the press in the production setting. Some of the features that may vary could be the actuator design, the mold, robotic loading and unloading, temperature regulation and resin injection equipment, and possibly platen motion equipment. The actuators simply include mechanisms that apply loads to a top cover or directly to the reservoir. The actuators could be hydraulic, pneumatic, solenoid, or any other mechanism that could apply the correct loads to the reservoir and preform. Robotics may be used for preform loading and part unloading. The actual implementation may depend on whether or not the mold moves in and out of the press. This may also complicate the mold temperature regulation equipment which might have to be coupled to the mold after it has been loaded into the press. Similarly, moving the mold into and out of the press would also complicate the injection equipment. In either case, the upper and/or lower platens may need to be mechanically separated so that the robots would have access to the mold or the mold would have enough clearance to move in and out.

There are some additional items which may be desired depending on the specific application. Depending on which actuator type is chosen, intermediate platens may be desired to accommodate bearings. Such bearings may be desired to react the side thrust loads created by the pressure actuators acting upon contours of the mold. Intermediate platens may also be desired to hold the pneumatic or hydraulic cylinders, the valves, and/or the plumbing of the pressure actuators.

If the mold is a permanent fixture of the press, a top cover could be lowered and held in place on the mold. This may require, for instance, a separate actuator with a locking device.

Even other embodiments of the invention will be apparent to those skilled in the art from consideration of the specification and practice of the invention disclosed herein.

It is intended that the specification and examples be considered as exemplary only, with a true scope and spirit of the invention to be indicated by the claims.

I claim:

1. A machine for molding a part having first and second surfaces from a raw material, comprising:
    a first mold having a surface that defines the first surface of the molded part; and
    a second mold having a platen and a plurality of pressure actuators extending therefrom and defining the second surface of the molded part, each of the plurality of pressure actuators capable of applying a pressure to the raw material;
    wherein at least two of the pressure actuators are nested.

2. The machine of claim 1, wherein at least one of the plurality of pressure actuators is capable being actuated substantially independently of the other pressure actuators.

3. The machine of claim 1, wherein at least one of the plurality of pressure actuators includes a transfer plate.

4. The machine of claim 1, wherein at least one of the plurality of pressure actuators includes a pad.

5. The machine of claim 1, wherein a controller controls each of the plurality of pressure actuators.

6. A machine for molding a part having first and second surfaces from a raw material, comprising:
    a first mold having a surface that defines the first surface of the molded part;
    a second mold having a platen and a plurality of pressure actuators extending therefrom and defining the second surface of the molded part, each of the plurality of pressure actuators capable of applying a pressure to the raw material; and
    at least a first seal located between a sliding surface of a first pressure actuator and a sliding surface of a second pressure actuator.

7. The machine of claim 6, wherein at least one of the plurality of pressure actuators is capable being actuated substantially independently of the other pressure actuators.

8. The machine of claim 6, wherein the first pressure actuator includes a first transfer plate, wherein the second pressure actuator includes a second transfer plate, and wherein the first seal is located between the first and second transfer plates.

9. The machine of claim 6, wherein the sliding surface of the first pressure actuator includes a channel and the first seal is located at least partially within the channel.

10. The machine of claim 6, wherein the first seal is a substantially vacuum tight seal.

11. The machine of claim 10, wherein the first seal is one of an elastomeric seal and a polymeric seal.

12. The machine of claim 6, wherein the first seal is a substantially resin tight seal.

13. The machine of claim 12, wherein the first seal is one of an elastomeric seal, a polymeric seal, and a braided compression seal infused with a polymer.

14. The machine of claim 9, further including a second seal located between the sliding surface of the first pressure actuator and the sliding surface of the second pressure actuator, wherein the sliding surface of one of the first pressure actuator and the second pressure actuator includes a second channel and the second seal is located at least partially within the second channel.

15. The machine of claim 14, wherein a seal energizing ring is located at least partially within the second channel.

16. A method for manufacturing a molded part in a press, the method comprising:
    providing a machine comprising;
    a first mold having a surface that defines a first surface of a molded part;

a second mold having a platen and a plurality of pressure actuators extending therefrom and defining a second surface of the molded part, each of the plurality of pressure actuators capable of applying a pressure to the raw material; and at least a first seal located between a sliding surface of a first pressure actuator and a sliding surface of a second pressure actuator:

positioning a preform having a thickness in the first mold;

placing a quantity of resin adjacent the preform, creating a resin reservoir;

selectively actuating one or more of the plurality of pressure actuators to apply pressure to the resin reservoir to force at least a portion of the resin reservoir to infuse through the thickness of the preform;

curing the resin-infused preform; and removing the cured resin-infused preform from the press.

17. The method of claim 16, wherein the step of selectively actuating includes selectively actuating one or more of the plurality of pressure actuators to apply pressure to the preform adjacent to that portion of the preform being infused through the thickness with resin.

18. The method of claim 16, wherein the step of selectively actuating includes selectively activating one or more of the plurality of pressure actuators to increase and decrease the pressure on at least a portion of the resin infused preform.

19. A method for manufacturing a molded structure, the method comprising:

providing a machine comprising;

a first mold having a surface that defines a first surface of a molded part; and a second mold having a platen and a plurality of pressure actuators extending therefrom and defining a second surface of the molded part, each of the plurality of pressure actuators capable of applying a pressure to the raw material:

wherein at least two of the pressure actuators are nested;

placing a quantity of a raw material into the first mold;

selectively actuating one or more of the pressure actuators apply pressure to the raw material to force at least a portion of the raw material to conform to the first mold;

curing the raw material to form a cured part; and removing the cured part from the first mold.

20. The method of claim 19, wherein the raw material includes a preform and a quantity of resin, the preform having a thickness and the quantity of resin forming a reservoir adjacent to the preform.

21. The method of claim 19, wherein the step of selectively actuating forces at least a portion of the resin to infuse through the thickness of at least a portion of the preform.

* * * * *

UNITED STATES PATENT AND TRADEMARK OFFICE
CERTIFICATE OF CORRECTION

PATENT NO. : 7,081,219 B2  Page 1 of 1
APPLICATION NO. : 10/388411
DATED : July 25, 2006
INVENTOR(S) : David H. Stewart It is certified that error appears in the above-identified patent and that said Letters Patent is hereby corrected as shown below:

Title page, item (57), line 9, "actuators apply" should read --actuators to apply--.

Claim 2, col. 28, line 13, "capable being" should read --capable of being--.

Claim 7, col. 28, line 34, "capable being" should read --capable of being--.

Claim 16, col. 28, line 65, "comprising;" should read --comprising:--.

Claim 16, col. 29, line 8, "actuator:" should read --actuator;--.

Claim 19, col. 30, line 3, "comprising;" should read --comprising:--.

Claim 19, col. 30, line 10, "material:" should read --material;--.

Claim 19, col. 30, lines 13-14, "actuators apply" should read --actuators to apply--.

Signed and Sealed this

Seventeenth Day of October, 2006

JON W. DUDAS
*Director of the United States Patent and Trademark Office*